United States Patent
Horn et al.

(10) Patent No.: US 9,713,057 B2
(45) Date of Patent: Jul. 18, 2017

(54) TECHNIQUES FOR SELECTED INTERNET PROTOCOL TRAFFIC OFFLOAD SUPPORT AT AN ASSISTING ENODEB

(71) Applicant: QUALCOMM Incorporated, San Diego, CA (US)

(72) Inventors: Gavin Bernard Horn, La Jolla, CA (US); Andrei Dragos Radulescu, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 14/333,236

(22) Filed: Jul. 16, 2014

(65) Prior Publication Data

US 2015/0029999 A1     Jan. 29, 2015

Related U.S. Application Data

(60) Provisional application No. 61/859,040, filed on Jul. 26, 2013.

(51) Int. Cl.
*H04W 36/22*     (2009.01)
*H04W 76/02*     (2009.01)
(Continued)

(52) U.S. Cl.
CPC ......... *H04W 36/22* (2013.01); *H04W 76/022* (2013.01); *H04L 45/306* (2013.01); *H04W 36/08* (2013.01); *H04W 36/12* (2013.01); *H04W 76/062* (2013.01); *H04W 92/045* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 2011/0045834 A1* | 2/2011 | Kim | ...................... H04L 45/306 455/438 |
| 2011/0171953 A1 | 7/2011 | Faccin et al. | |

(Continued)

FOREIGN PATENT DOCUMENTS

| | | | | |
|---|---|---|---|---|
| KR | WO 2012177024 A1 * | 12/2012 | ............ | H04W 8/082 |
| WO | WO-2011129070 A1 | 10/2011 | | |

(Continued)

OTHER PUBLICATIONS

IPEA/EPO, Second Written Opinion of the International Preliminary Examining Authority, Int'l App. No. PCT/US2014/046983, Sep. 17, 2015, European Patent Office, Munich, DE, 15 pgs.

Huawei et al., "SIPTO RAN Impacts for Collocated L-GW," 3GPP TSG-RAN WG3 #80, Fukuoka, Japan, May 20-24, 2013, R3-130867, 3 pgs., downloaded from http://www.3gpp.org/FTP/tsg_ran/WG3_lu/TSGR3_80/Docs/, 3rd Generation Partnership Project, Sophia-Antipolis Cedex; France.

(Continued)

*Primary Examiner* — Vinncelas Louis

(57) ABSTRACT

Techniques are described for selected internet protocol traffic offload (SIPTO) support at an assisting eNodeB. A connection may be established between a first eNodeB and a UE, and it may be determined whether a connection exists or is pending between the UE and a second eNodeB. A message may be transmitted to a mobility management entity (MME), the message associating a network address of the second eNodeB with SIPTO connectivity for the UE.

26 Claims, 17 Drawing Sheets

(51) Int. Cl.
*H04L 12/725* (2013.01)
*H04W 36/12* (2009.01)
*H04W 36/08* (2009.01)
*H04W 92/04* (2009.01)
*H04W 92/20* (2009.01)
*H04W 76/06* (2009.01)

(56) References Cited

U.S. PATENT DOCUMENTS

2014/0003241 A1* 1/2014 Kim .................. H04W 36/22
370/235
2014/0119340 A1* 5/2014 Stojanovski .......... H04W 8/082
370/331

FOREIGN PATENT DOCUMENTS

| WO | WO-2012135467 A1 | 10/2012 |
| WO | WO-2012177023 A1 | 12/2012 |
| WO | WO-2013010005 A1 | 1/2013 |
| WO | WO-2013091236 A1 | 6/2013 |

OTHER PUBLICATIONS

ISA/EPO, International Search Report and Written Opinion of the International Searching Authority, Int'l App. No. PCT/US2014/046983, Jan. 7, 2015, European Patent Office, Rijswijk, NL, 21 pgs.
3GPP, "3rd Generation Partnership Project; Technical Specification Group Services and System Aspects; Local IP Access and Selected IP Traffic Offload (LIPA-SIPTO) (Release 10)" 3GPP TR 23.829 v10.0.1 (Oct. 2011) Technical Report, Oct. 2011, pp. 1-43, 3rd Generation Partnership Project, Sophia Antipolis, France.
ISA/EPO, Partial International Search Report of the International Searching Authority, Int'l App. No. PCT/US2014/046983, Nov. 17, 2014, European Patent Office, Rijswijk, NL, 5 pgs.
IPEA/EPO, Second Written Opinion of the International Preliminary Examining Authority, Int'l App. No. PCT/US2014/046983, Jul. 31, 2015, European Patent Office, Munich, DE, 12 pgs.
EPO, Supplementary European Search Report, EP App. No. EP16200549, Mar. 21, 2017, European Patent Office, Munich, DE, 10 pgs.

* cited by examiner

TECHNIQUES FOR SELECTED INTERNET PROTOCOL TRAFFIC OFFLOAD SUPPORT AT AN ASSISTING ENODEB

CROSS REFERENCES

The present Application for patent claims priority to U.S. Provisional Patent Application No. 61/859,040 by Horn et al., entitled "Method And Apparatus For Selected Internet Protocol Traffic Offload (SIPTO) Support At An Assisting eNodeB," filed Jul. 26, 2013, assigned to the assignee hereof, and expressly incorporated by reference herein.

FIELD OF THE DISCLOSURE

The following relates generally to wireless communication, and more specifically to Selected Internet Protocol Traffic Offload (SIPTO) for wireless communication.

DESCRIPTION OF RELATED ART

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. The downlink (or forward link) refers to the communication link from an eNodeB or other base station to a user equipment (UE), and the uplink (or reverse link) refers to the communication link from the UE to the eNodeB or other base station. Each base station has a coverage range, which may be referred to as the coverage area of the cell.

Traffic between a UE and the core network may be conveyed over a bearer having a defined minimum Quality of Service (QoS), which is enforced by a cellular radio access network. In some systems, an eNodeB may be capable of increasing user plane throughput by offloading at least a portion of bearer traffic to or from a UE through a local gateway instead of the core network. Techniques for implementing such offloading in systems where multiple eNodeBs communicate with a single UE, however, remain undeveloped.

SUMMARY

The described features generally relate techniques for implementing selected internet protocol traffic offload (SIPTO) for systems in which multiple eNodeBs coordinate with each other to communicate with a single UE. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

According to a first set of illustrative embodiments, a method of wireless communication may include establishing a connection between a first eNodeB and a user equipment (UE); determining whether a connection exists or is pending between the UE and a second eNodeB; and transmitting to a mobility management entity (MME) a message associating a network address for a local gateway of the second eNodeB with selected internet protocol traffic offload (SIPTO) connectivity for the UE.

In certain examples, the network address of the local gateway associated with the second eNodeB is forwarded to the mobility management entity via an S1 message. The network address of a local gateway associated with the first eNodeB may be replaced with the network address of the local gateway associated with the second eNodeB in a gateway transport layer address information element of the S1 message. The S1 message may further include a network address of a local gateway associated with the first eNodeB.

In certain examples, a SIPTO packet data network (PDN) connection may be deactivated at the first eNodeB. The SIPTO PDN connection may be deactivated in response to determining that a connection exists between the UE and the second eNodeB. The deactivation of the SIPTO PDN connection at the first eNodeB may, in some examples, be in response to a change in location of the UE. A deactivate bearer request message may be bearer request message may include a reactivation request. The SIPTO PDN connection may, in additional or alternative examples, be deactivated via an E-RAB release message transmitted over an S1 interface. The SIPTO PDN connection may, in additional or alternative examples, be deactivated via a delete bearer request message transmitted over an S5 interface.

In certain examples, the determining whether the connection exists or is pending between the UE and the second eNodeB may include at least one of: determining whether data is being received from the second eNodeB for the UE, transmitting a request to the UE to establish a connection between the UE and the second eNodeB, or receiving an indication from the second eNodeB that the UE has established a connection. The request transmitted to establish a connection between the UE and the second eNodeB may be based at least in part on a handover of the UE from a third eNodeB to the second eNodeB. Additionally or alternatively, the request transmitted to establish a connection between the UE and the second eNodeB may be based at least in part on an instruction provided by the first eNodeB.

In certain examples, the network address for the local gateway of the second eNodeB may be determined based on at least one of: a common control message exchanged between the first eNodeB and the second eNodeB over an X2 interface; a dedicated control message exchanged between the first eNodeB and the second eNodeB over the X2 interface; an operations, administration and management (OAM) message from an OAM server; and an S1 control message exchanged between the first eNodeB and the second eNodeB via the mobility management entity.

According to a second set of illustrative embodiments, an apparatus for managing wireless communications may include at least one processor; and a memory communicatively coupled with the at least one processor. The at least one processor may be configured to execute code stored on the memory to: establish a connection between a first eNodeB and a user equipment (UE); determine whether a connection exists or is pending between the UE and a second eNodeB; and transmit to a mobility management entity (MME) a message associating a network address for a local gateway of the second eNodeB with selected internet protocol traffic offload (SIPTO) connectivity for the UE.

In certain examples, the at least one processor may be configured to execute code stored on the memory to implement one or more aspects of first set of illustrative embodiments described above.

According to a third set of illustrative embodiments, an apparatus for managing wireless communications may include means for establishing a connection between a first eNodeB and a user equipment (UE); means for determining whether a connection exists or is pending between the UE and a second eNodeB; and means for transmitting to a mobility management entity (MME) a message associating a network address for a local gateway of the second eNodeB with selected internet protocol traffic offload (SIPTO) connectivity for the UE.

In certain examples, the apparatus may include means for implementing one or more aspects of first set of illustrative embodiments described above.

According to a fourth set of illustrative embodiments, a computer program product may include a non-transitory computer-readable medium having computer-readable code. The computer-readable code may be configured to cause at least one processor to: establish a connection between a first eNodeB and a user equipment (UE); determine whether a connection exists or is pending between the UE and a second eNodeB; and transmit to a mobility management entity (MME) a message associating a network address for a local gateway of the second eNodeB with selected internet protocol traffic offload (SIPTO) connectivity for the UE.

In certain examples, the computer-readable code may be configured to cause the at least one processor to implement one or more aspects of first set of illustrative embodiments described above.

According to a fifth set of illustrative embodiments, a method of managing wireless communications may include receiving, at a mobility management entity (MME), a request to establish a packet data network (PDN) connection for a user equipment (UE); determining whether selected internet protocol traffic offload (SIPTO) is permitted for the UE based on a set of stored subscription information for the UE; determining a first network address of a first local gateway associated with a first eNodeB and a second network address of a second local gateway associated with a second eNodeB; and selecting one of the first local gateway or the second local gateway to implement the SIPTO for the PDN connection in response to the determination that the SIPTO is permitted for the UE.

In certain examples, at least one other SIPTO PDN connection of the UE may be deactivated in response to determining that the UE has connected to the second eNodeB. The at least one other SIPTO PDN connection of the UE may be routed through one of the first local gateway or a third local gateway associated with a third eNodeB.

In certain examples, a list of available SIPTO network addresses from one of the first eNodeB or the second eNodeB may be received. The list of available SIPTO network addresses may include the first network address and the second network address.

In certain examples, the network addresses for the first local gateway and the second local gateway may be determined based on at least one of: subscription information for the UE, network policy or a type of network address.

According to a sixth set of illustrative embodiments, an apparatus for managing wireless communications, may include at least one processor and a memory communicatively coupled with the at least one processor. The at least one processor may be configured to execute code stored on the memory to: receive a request to establish a packet data network (PDN) connection for a user equipment (UE); determine whether selected internet protocol traffic offload (SIPTO) is permitted for the UE based on a set of stored subscription information for the UE; determine a first network address of a first local gateway associated with a first eNodeB and a second network address of a second local gateway associated with a second eNodeB; and select one of the first local gateway or the second local gateway to implement the SIPTO for the PDN connection in response to the determination that the SIPTO is permitted for the UE.

In certain examples, the at least one processor may be configured to execute code stored on the memory to implement one or more aspects of the fifth set of illustrative embodiments described above.

According to a seventh set of illustrative embodiments, an apparatus for managing wireless communications, may include means for receiving a request to establish a packet data network (PDN) connection for a user equipment (UE); means for determining whether selected internet protocol traffic offload (SIPTO) is permitted for the UE based on a set of stored subscription information for the UE; means for determining a first network address of a first local gateway associated with a first eNodeB and a second network address of a second local gateway associated with a second eNodeB; and means for selecting one of the first local gateway or the second local gateway to implement the SIPTO for the PDN connection in response to the determination that the SIPTO is permitted for the UE.

In certain examples, the apparatus may further include means for implementing one or more aspects of the fifth set of illustrative embodiments described above.

According to an eighth set of illustrative embodiments, a computer program product may include a non-transitory computer-readable medium comprising computer-readable code. The computer-readable code may be configured to cause at least one processor to: receive a request to establish a packet data network (PDN) connection for a user equipment (UE); determine whether selected internet protocol traffic offload (SIPTO) is permitted for the UE based on a set of stored subscription information for the UE; determine a first network address of a first local gateway associated with a first eNodeB and a second network address of a second local gateway associated with a second eNodeB; and select one of the first local gateway or the second local gateway to implement the SIPTO for the PDN connection in response to the determination that the SIPTO is permitted for the UE.

In certain examples, the computer-readable code may be further configured to implement one or more aspects of the fifth set of illustrative embodiments described above.

According to a ninth set of illustrative embodiments, a method for managing wireless communications may include receiving, at a first eNodeB, a request to establish a bearer for a user equipment (UE); determining whether the request is associated with a selected internet protocol traffic offload (SIPTO) packet data network (PDN) connection for the UE at a second eNodeB; communicating with the second eNodeB to establish the bearer in response to the determination that the request is associated with the SIPTO PDN connection for the UE at the second eNodeB; and establishing a radio bearer corresponding to the SIPTO PDN connection with the UE.

In certain examples, the request to establish the bearer for the UE may be provided by a mobility management entity (MME) to establish an E-RAB bearer. In certain examples, determining whether the request is associated with the SIPTO PDN connection for the UE at the second eNodeB may include determining whether the request includes an identifier that correlates the bearer with an S5 bearer, wherein the S5 bearer is established between a local gateway of the second eNodeB and a serving gateway. The first eNodeB may transmit the identifier to the second eNodeB during the communication with the second eNodeB to establish the bearer.

In certain examples, determining whether the request is associated with the SIPTO PDN connection for the UE at the second eNodeB may include determining whether a network address of a local gateway of the second eNodeB is sent to a mobility management entity (MME).

In certain examples, the request may be received at the first eNodeB over an S1 interface and the communication with the second eNodeB to establish the bearer occurs over an X2 interface.

In certain examples, radio bearer configuration parameters may be received from the second eNodeB. The radio bearer corresponding to the SIPTO PDN connection may be established based on the radio bearer configuration parameters received from the second eNodeB.

In certain examples, transmitting the request to establish the bearer may include transmitting radio bearer configuration parameters to the second eNodeB.

According to a tenth set of illustrative embodiments, an apparatus for managing wireless communications, may include at least one processor; and a memory communicatively coupled with the at least one processor. The at least one processor may be configured to execute code stored on the memory to receive a request to establish a bearer for a user equipment (UE); determine whether the request is associated with a selected internet protocol traffic offload (SIPTO) packet data network (PDN) connection for the UE at a second eNodeB; communicate with the second eNodeB to establish the bearer in response to the determination that the request is associated with the SIPTO PDN connection for the UE at the second eNodeB; and establish a radio bearer corresponding to the SIPTO PDN connection with the UE.

In certain examples, the at least one processor may be configured to execute code stored on the memory to implement one or more aspects of the ninth set of illustrative embodiments described above.

According to an eleventh set of illustrative embodiments, an apparatus for managing wireless communications, may include means for receiving a request to establish a bearer for a user equipment (UE); means for determining whether the request is associated with a selected internet protocol traffic offload (SIPTO) packet data network (PDN) connection for the UE at a second eNodeB; means for communicating with the second eNodeB to establish the bearer in response to the determination that the request is associated with the SIPTO PDN connection for the UE at the second eNodeB; and means for establishing a radio bearer corresponding to the SIPTO PDN connection with the UE.

In certain examples, the may include means for implementing one or more aspects of the ninth set of illustrative embodiments described above.

According to a twelfth set of illustrative embodiments, a computer program product may include a non-transitory computer-readable medium comprising computer-readable code. The computer-readable code may be configured to cause at least one processor to receive a request to establish a bearer for a user equipment (UE); determine whether the request is associated with a selected internet protocol traffic offload (SIPTO) packet data network (PDN) connection for the UE at a second eNodeB; communicate with the second eNodeB to establish the bearer in response to the determination that the request is associated with the SIPTO PDN connection for the UE at the second eNodeB; and establish a radio bearer corresponding to the SIPTO PDN connection with the UE.

In certain examples, the computer-readable code may be further configured to implement one or more aspects of the ninth set of illustrative embodiments described above.

According to a thirteenth set of illustrative embodiments, a method may include receiving, at a second eNodeB, a request to establish a bearer for a UE from a first eNodeB; determining whether the request is associated with a selected internet protocol traffic offload (SIPTO) packet data network (PDN) connection for the UE at the second eNodeB; establishing the bearer at the second eNodeB based at least in part on the determination that the request is associated with the SIPTO PDN connection; determining radio bearer configuration parameters corresponding to the SIPTO PDN connection for the UE; and carrying offloaded network traffic associated with the SIPTO PDN connection for the UE to a local gateway of the second eNodeB.

In certain examples, determining whether the request is associated with the SIPTO PDN connection for the UE at the second eNodeB may include determining whether the request includes an identifier that correlates the bearer with an S5 bearer. The S5 bearer may be established between a local gateway of the second eNodeB and a serving gateway.

In certain examples, determining the radio bearer configuration parameters may include receiving the radio bearer configuration parameters from the first eNodeB.

In certain examples, the radio bearer configuration parameters may be transmitted to the first eNodeB.

In certain examples, the SIPTO PDN connection at the second eNodeB may be deactivated. The SIPTO PDN connection at the second eNodeB may be deactivated in response to at least one of: a change in a connection status of the UE, a change in location of the UE, or a change in SIPTO scheduling at the second eNodeB. The SIPTO PDN connection may be deactivated by, for example, transmitting an E-RAB release indication request message over an X2 interface to the first eNodeB. Additionally or alternatively, the SIPTO PDN connection may be deactivated by transmitting a delete bearer request message over an S5 interface from a local gateway of the second eNodeB to a serving gateway. The delete bearer request message may include a request for bearer reactivation. Additionally or alternatively, the SIPTO PDN connection may be deactivated by receiving a deactivation request from the first eNodeB at the second eNodeB, and transmitting a deactivation status from the second eNodeB to the first eNodeB.

According to a fourteenth set of illustrative embodiments, an apparatus for managing wireless communications may include at least one processor and a memory communicatively coupled with the at least one processor. The at least one processor may be configured to execute code stored on the memory to receive a request to establish a bearer for a UE from a first eNodeB; determine whether the request is associated with a selected internet protocol traffic offload (SIPTO) packet data network (PDN) connection for the UE at the second eNodeB; establish the bearer at the second eNodeB based at least in part on the determination that the request is associated with the SIPTO PDN connection; determine radio bearer configuration parameters corresponding to the SIPTO PDN connection for the UE; and carry offloaded network traffic associated with the SIPTO PDN connection for the UE to a local gateway of the second eNodeB.

In certain examples, the processor may be further configured to execute code stored on the memory to implement one or more aspects of the thirteenth set of illustrative embodiments described above.

According to a fifteenth set of illustrative embodiments, an apparatus for managing wireless communications may include means for receiving a request to establish a bearer for a UE from a first eNodeB; means for determining whether the request is associated with a selected internet protocol traffic offload (SIPTO) packet data network (PDN) connection for the UE at the second eNodeB; means for establishing the bearer at the second eNodeB based at least in part on the determination that the request is associated with the SIPTO PDN connection; means for determining radio bearer configuration parameters corresponding to the SIPTO PDN connection for the UE; and means for carrying offloaded network traffic associated with the SIPTO PDN connection for the UE to a local gateway of the second eNodeB.

In certain examples, the apparatus may further include means for implementing one or more aspects of the thirteenth set of illustrative embodiments described above.

According to a sixteenth set of illustrative embodiments, a computer program product may include a non-transitory computer-readable medium comprising computer-readable code. The computer-readable code may be configured to cause at least one processor to: receive a request to establish a bearer for a UE from a first eNodeB; determine whether the request is associated with a selected internet protocol traffic offload (SIPTO) packet data network (PDN) connection for the UE at the second eNodeB; establish the bearer at the second eNodeB based at least in part on the determination that the request is associated with the SIPTO PDN connection; determine radio bearer configuration parameters corresponding to the SIPTO PDN connection for the UE; and carry offloaded network traffic associated with the SIPTO PDN connection for the UE to a local gateway of the second eNodeB.

In certain examples, the computer-readable code may be further configured to cause the at least one processor to implement one or more aspects of the thirteenth set of illustrative embodiments described above.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
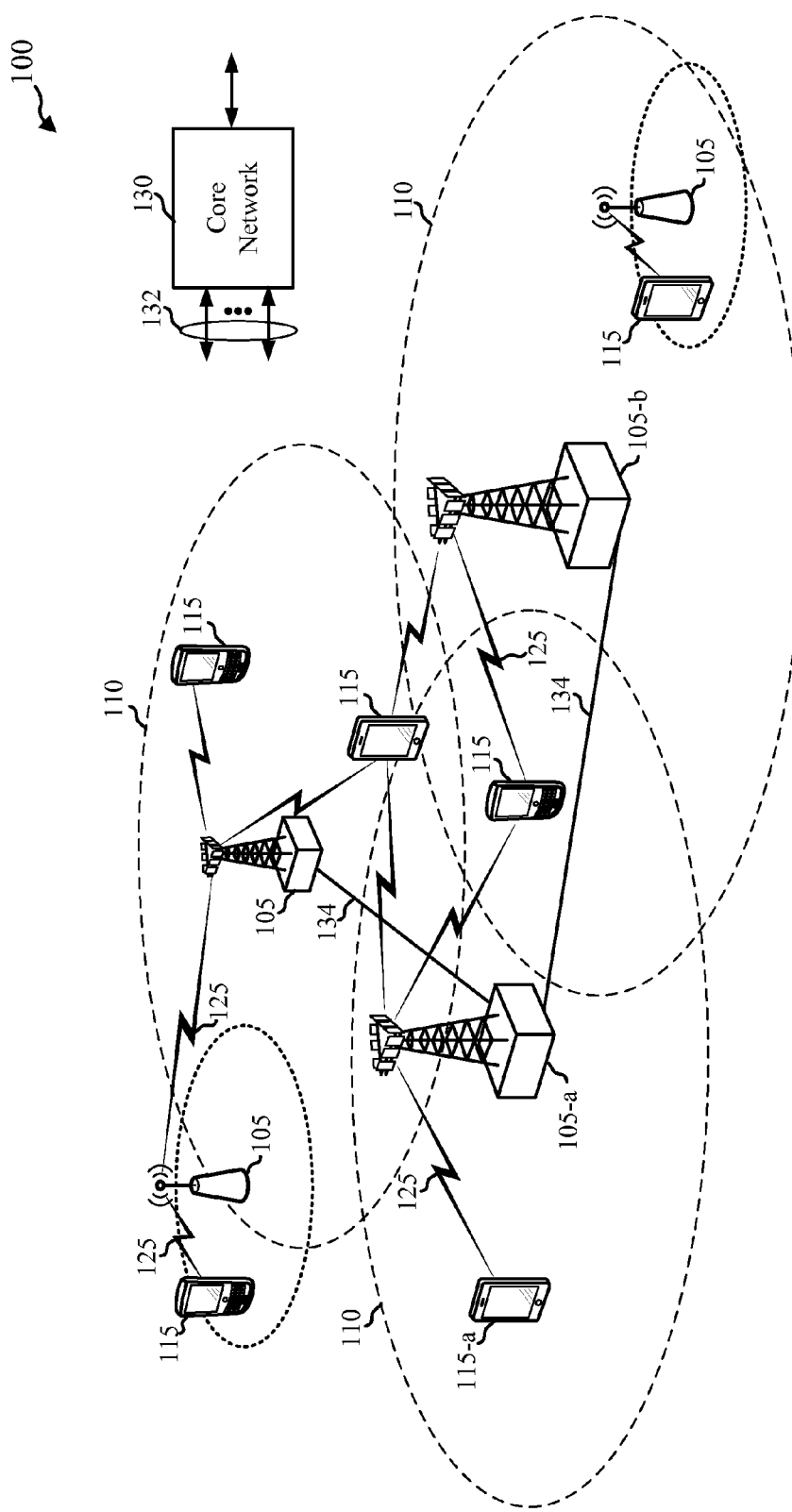
FIG. 1 shows a block diagram conceptually illustrating an example of a wireless communications system, in accordance with an aspect of the present disclosure.

The present disclosure describes techniques for extending selected internet protocol traffic offload (SIPTO) or similar network traffic offloading for a UE to eNodeBs other than the anchor eNodeB serving the UE. When a UE is in communication with at least an anchor eNodeB and an assisting eNodeB, a SIPTO packet data network (PDN) connection may be established at a local gateway of the assisting eNodeB to accommodate bearer traffic between the UE and the PDN. The local gateway of the assisting eNodeB may be selected to provide SIPTO support to the UE by the anchor eNodeB or a mobility management entity (MME) of a core network.

In the present disclosure, procedures may be defined for: 1) determining the network address of the local gateway for the assisting eNodeB, 2) determining to establish the SIPTO PDN connection at the assisting eNodeB, and 3) establishing the direct path between the assisting eNodeB and the local gateway of the assisting eNodeB for the SIPTO PDN connection.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

As used in the present description and the appended claims, the term "bearer" refers to a link between two communication nodes in a communication network.

As used in the present description and the appended claims, the term "anchor eNodeB" refers to an eNodeB which terminates an S1-MME interface to a core network for a UE, therefore acting as a mobility anchor to the core network for that UE.

As used in the present description and the appended claims, the term "assisting eNodeB" refers to an eNodeB, other than an anchor eNodeB of a UE, that provides additional radio resources for the UE.

It will be understood that the classification of an eNodeB as an anchor eNodeB or an assisting eNodeB with respect to a UE may change dynamically based on the location, rate and direction of speed, signal strength, and/or other variable factors associated with the UE. A single eNodeB may serve as both an anchor eNodeB for one UE and an assisting eNodeB for another UE. It will be further understood that an eNodeB may serve as the anchor eNodeB for a UE and then transition to serving as an assisting eNodeB for that UE or not communicating with that UE. Similarly, it will be understood that an eNodeB may serve as an assisting eNodeB for a given UE, and then transition to serving as an anchor eNodeB for that UE or not communicating with that UE.

FIG. 1 is a block diagram conceptually illustrating an example of a wireless communications system 100, in accordance with an aspect of the present disclosure. The wireless communications system 100 includes eNodeBs 105, user equipment (UEs) 115, and a core network 130. The eNodeBs 105 may communicate with the UEs 115 under the control of a base station controller (not shown), which may be part of the core network 130 or the eNodeBs 105 in various embodiments. The eNodeBs 105 may communicate control information and/or user data with the core network 130 through first backhaul links 132. In embodiments, the eNodeBs 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The eNodeBs 105 may wirelessly communicate with the UEs 115 via one or more base station antennas. Each of the eNodeB 105 sites may provide communication coverage for a respective geographic coverage area 110. In the present example, the terms evolved Node B (eNodeB) may be generally used to describe the base stations of the wireless communications system 100. In additional or alternative embodiments, other types of base stations may be used, including base transceiver stations, radio base stations, access points, radio transceivers, basic service sets (BSSs), extended service sets (ESSs), NodeBs, or Home NodeBs. The geographic coverage area 110 for an eNodeB 105 may be divided into sectors making up only a portion of the coverage area (not shown). The wireless communications system 100 may include eNodeBs 105 of different types (e.g., macro, micro, and/or pico base stations). There may be overlapping coverage areas for different technologies.

In embodiments, the wireless communications system 100 is an LTE/LTE-A network communication system. The wireless communications system 100 may be a Heterogeneous LTE/LTE-A network in which different types of eNodeBs 105 provide coverage for various geographical regions. For example, each eNodeB 105 may provide communication coverage for a macro cell, a pico cell, a femto cell, and/or other types of cell. A macro cell generally covers a relatively large geographic area (e.g., several kilometers in radius) and may allow unrestricted access by UEs 115 with service subscriptions with the network provider. A pico cell would generally cover a relatively smaller geographic area (e.g., buildings) and may allow unrestricted access by UEs 115 with service subscriptions with the network provider. A femto cell would also generally cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNodeB 105 for a macro cell may be referred to as a macro eNodeB. An eNodeB 105 for a pico cell may be referred to as a pico eNodeB. And, an eNodeB 105 for a femto cell may be referred to as a femto eNodeB or a home eNodeB. An eNodeB 105 may support one or multiple (e.g., two, three, four, and the like) cells.

The core network 130 may communicate with the eNodeBs 105 or other base stations via first backhaul links 132 (e.g., S1 interface, etc.). The eNodeBs 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operation. For synchronous operation, the eNodeBs 105 may have similar frame timing, and transmissions from different eNodeBs 105 may be approximately aligned in time. For asynchronous operation, the eNodeBs 105 may have different frame timing, and transmissions from different eNodeBs 105 may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNodeBs, pico eNodeBs, femto eNodeBs, relays, and the like.

The communication links 125 shown in the wireless communications system 100 may include uplink (UL) transmissions from a UE 115 to an eNodeB 105, and/or downlink (DL) transmissions, from an eNodeB 105 to a UE 115. The downlink transmissions may also be called forward link transmissions while the uplink transmissions may also be called reverse link transmissions.

In certain examples, a UE 115 may be capable of simultaneously communicating with multiple eNodeBs 105. When multiple eNodeBs 105 support a UE 115, one of the eNodeBs 105 may be designated as the anchor eNodeB 105 for that UE 115, and one or more other eNodeBs 105 may be designated as the assisting eNodeBs 105 for that UE 115. For example, an assisting eNodeB 105 is associated with a local gateway communicatively coupled to a packet data network (PDN), core network 130 resources may be conserved by offloading a portion of network traffic between the UE 115 and that PDN through the local gateway of the assisting eNodeB 105 rather than transmitting the traffic through the core network 130. For example, a SIPTO PDN connection may be set up at the assisting eNodeB 105 for the UE 115.

Wireless communications systems of the prior art limit SIPTO support to anchor eNodeBs 105, and do not provide a way to enable SIPTO for a UE 115 at an assisting eNodeB 105. As demonstrated by the description of the ensuing Figures, however, the present disclosure provides methods and apparatus for setting up and tearing down SIPTO PDN connections at assisting eNodeBs 105.

Figure 2:
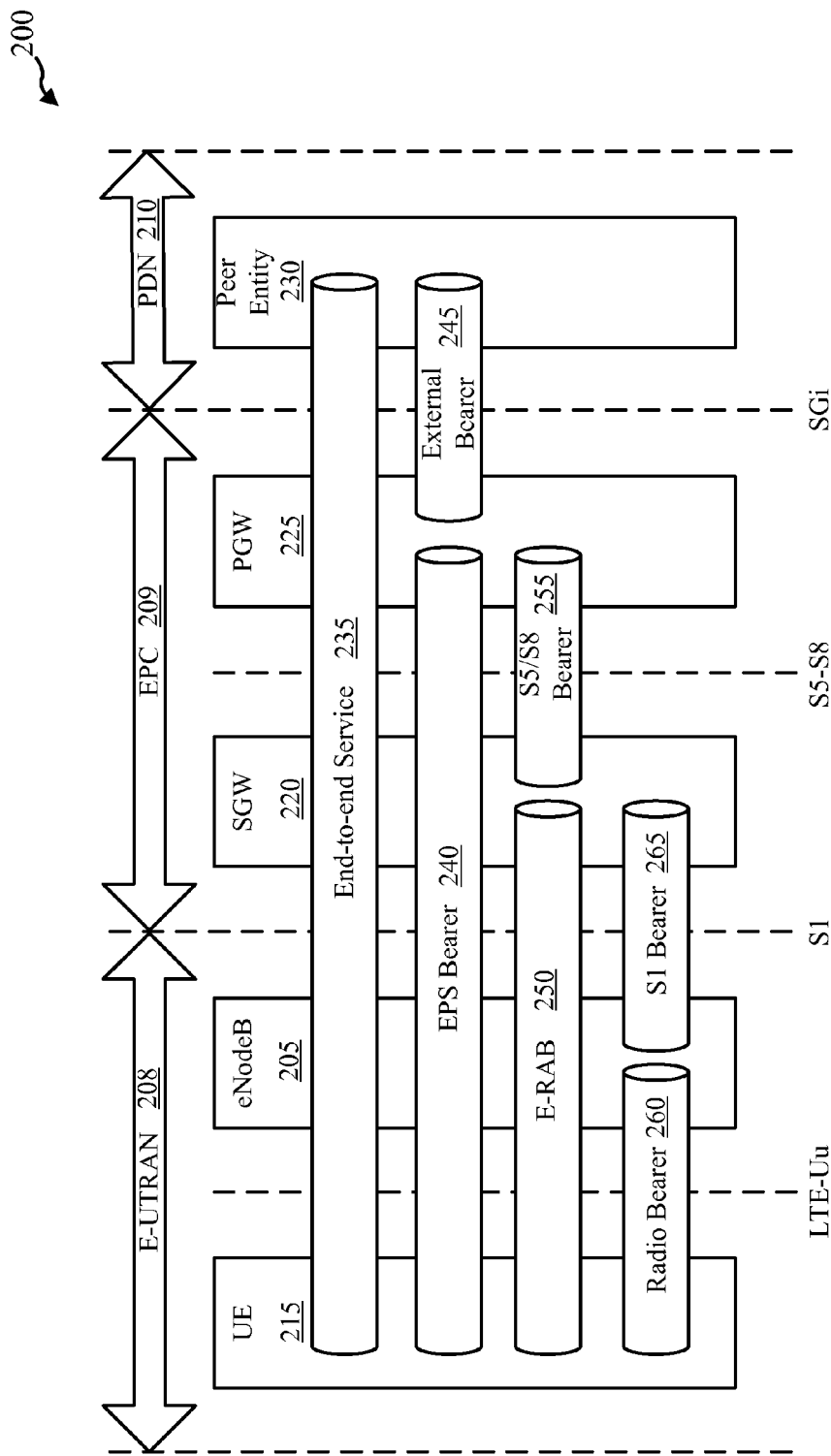
FIG. 2 is a block diagram conceptually illustrating an example of a bearer architecture in a wireless communications system, in accordance with an aspect of the present disclosure.

FIG. 2 is a block diagram conceptually illustrating an example of a bearer architecture in a wireless communications system 200, in accordance with an aspect of the present disclosure. The bearer architecture may be used to provide an end-to-end service 235 between a UE 215 and a peer entity 230 addressable over a network. The peer entity 230 may be a server, another UE, or another type of network-addressable device. The end-to-end service 235 may forward data between UE 215 and the peer entity 230 according to a set of characteristics (e.g., QoS) associated with the end-to-end service 235. The end-to-end service 235 may be implemented by at least the UE 215, an eNodeB 205, a serving gateway (SGW) 220, a packet data network (PDN) gateway (PGW) 225, and the peer entity 230. The UE 215 and eNodeB 205 may be components of an evolved UMTS terrestrial radio access network (E-UTRAN) 208, which is the air interface of the LTE/LTE-A systems. The serving gateway 220 and PDN gateway 225 may be components of an evolved Packet Core (EPC) 209, which is the core network architecture of LTE/LTE-A systems. The peer entity 230 may be an addressable node on a PDN 210 communicatively coupled with the PDN gateway 225.

The end-to-end service 235 may be implemented by an evolved packet system (EPS) bearer 240 between the UE 215 and the PDN gateway 225, and by an external bearer 245 between the PDN gateway 225 and the peer entity 230 over an SGi interface. The SGi interface may expose an internet protocol (IP) or other network-layer address of the UE 215 to the PDN 210.

The EPS bearer 240 may be an end-to-end tunnel defined to a specific QoS. Each EPS bearer 240 may be associated with a plurality of parameters, for example, a QoS class identifier (QCI), an allocation and retention priority (ARP), a guaranteed bit rate (GBR), and an aggregate maximum bit rate (AMBR). The QCI may be an integer indicative of a QoS class associated with a predefined packet forwarding treatment in terms of latency, packet loss, GBR, and priority. In certain examples, the QCI may be an integer from 1 to 9. The ARP may be used by a scheduler of an eNodeB 205 to provide preemption priority in the case of contention between two different bearers for the same resources. The GBR may specify separate downlink and uplink guaranteed bit rates. Certain QoS classes may be non-GBR such that no guaranteed bit rate is defined for bearers of those classes.

The EPS bearer 240 may be implemented by an E-UTRAN radio access bearer (E-RAB) 250 between the UE 215 and the serving gateway 220, and an S5/S8 bearer 255 between the serving gateway 220 and the PDN gateway 225 over an S5 or S8 interface. S5 refers to the signaling interface between the serving gateway 220 and the PDN gateway 225 in a non-roaming scenario, and S8 refers to an analogous signaling interface between the serving gateway 220 and the PDN gateway 225 in a roaming scenario. The E-RAB 250 may be implemented by a radio bearer 260 between the UE 215 and the eNodeB 205 over an LTE-Uu air interface and by an S1 bearer 265 between the eNodeB 205 and the serving gateway 220 over an S1 interface.

It will be understood that, while FIG. 2 illustrates the bearer hierarchy in the context of an example of end-to-end service 235 between the UE 215 and the peer entity 230, certain bearers may be used to convey data unrelated to end-to-end service 235. For example, radio bearers 260 or other types of bearers may be established to transmit control data between two or more entities where the control data is unrelated to the data of the end-to-end service 235.

As discussed above with respect to FIG. 1, in certain configurations data related to one or more EPS bearers 240 may be offloaded from an anchor eNodeB 205 to a local gateway (not shown) of an assisting eNodeB 205, thereby diverting bearer traffic away from the EPC 209 and to the PDN 210 over an alternate path. Many systems, for example, enable SIPTO at an anchor eNodeB 205 of the UE 215 to conserve core network resources and provide an improved service to the UE 215. However, in some cases the UE 215 may be in communication with both an anchor eNodeB 205 and one or more assisting eNodeBs 205. In such examples, the anchor eNodeB 205 may not support SIPTO, but one of the assisting eNodeBs 205 may support SIPTO. In other examples, one of the assisting eNodeBs 205 may have more network resources available for SIPTO PDN connections than the anchor eNodeB 205. The present description describes methods and apparatuses for setting up and taking down SIPTO PDN connections at one or more assisting eNodeBs 205.

Figure 3A:
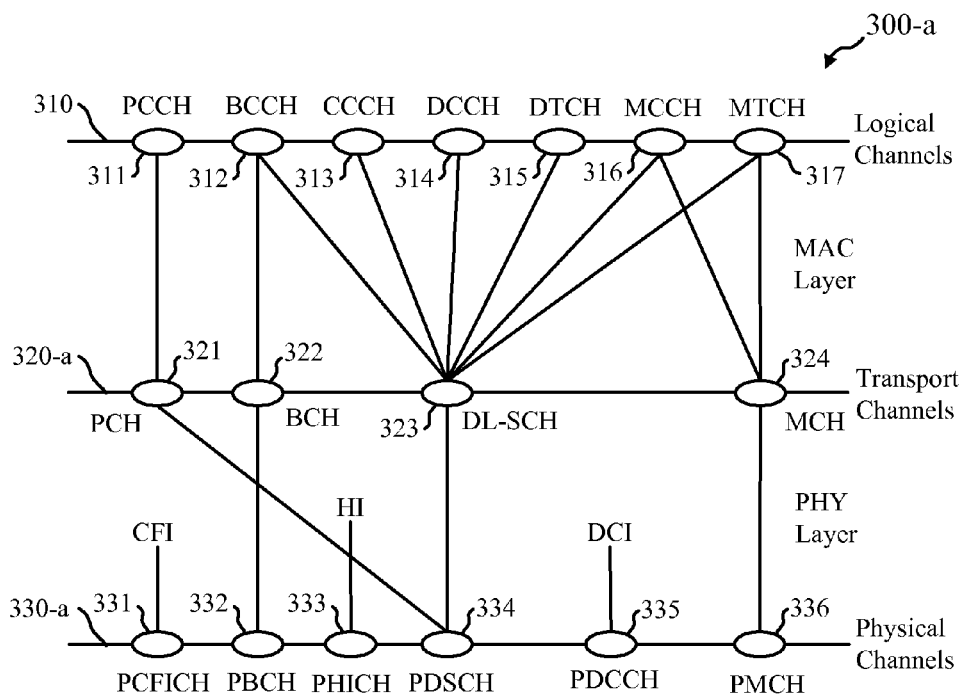
FIG. 3A is a block diagram conceptually illustrating an example of downlink channels in a wireless communications system, in accordance with an aspect of the present disclosure.
Figure 3B:
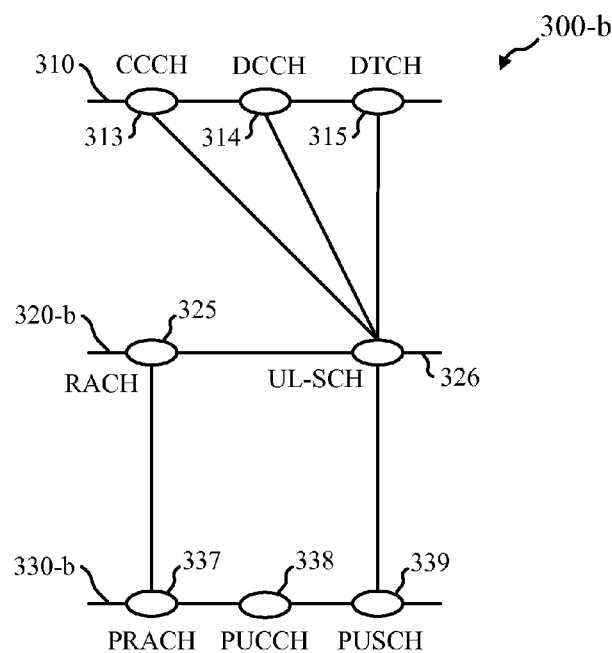
FIG. 3B is a block diagram conceptually illustrating an example of uplink channels in a wireless communications system, in accordance with an aspect of the present disclosure.

FIG. 3A is a block diagram conceptually illustrating an example of downlink channels in a wireless communications system 300-a, in accordance with an aspect of the present disclosure, and FIG. 3B is a block diagram conceptually illustrating an example of uplink channels in a wireless communications system 300-b, in accordance with an aspect of the present disclosure. The channelization hierarchy may be implemented by, for example, the wireless communications system 100 of FIG. 1 or the wireless communications system 200 of FIG. 2. Downlink channelization hierarchy 300-a may illustrate, for example, channel mapping between logical channels 310, downlink transport channels 320-a, and downlink physical channels 330-a of an LTE/LTE-A network.

Logical channels 310 may be classified into Control Channels and Traffic Channels. Each logical channel 310 may be associated with a separate radio bearer 260 (shown in FIG. 2); that is, there may be a one-to-one correlation between logical channels 310 and radio bearers 260. The radio bearers 260 conveying data (e.g., for EPS bearers 240) may be referred to as data radio bearers (DRBs), while radio bearers 260 conveying control data (e.g., for control channels) may be referred to as control radio bearers (CRBs).

Logical control channels may include a paging control channel (PCCH) 311, which is the downlink channel that transfers paging information, a broadcast control channel (BCCH) 312, which is the downlink channel for broadcasting system control information, and a multicast control channel (MCCH) 316, which is a point-to-multipoint downlink channel used for transmitting multimedia broadcast and multicast service (MBMS) scheduling and control information for one or several multicast traffic channels (MTCHs) 317.

Generally, after establishing radio resource control (RRC) connection, MCCH 316 is only used by the user equipment that receive MBMS. Dedicated control channel (DCCH) 314 is another logical control channel that is a point-to-point bi-directional channel transmitting dedicated control information, such as user-specific control information used by the user equipment having an RRC connection. Common control channel (CCCH) 313 is also a logical control channel that may be used for random access information. Logical traffic channels may include a dedicated traffic channel (DTCH) 315, which is a point-to-point bi-directional channel dedicated to one user equipment for the transfer of user information and a MTCH 317, which may be used for point-to-multipoint downlink transmission of traffic data.

The communication networks that accommodate some of the various embodiments may additionally include logical transport channels that are classified into downlink (DL) and uplink (UL). The DL transport channels 320-a may include a broadcast channel (BCH) 322, a downlink shared data channel (DL-SCH) 323, a multicast channel (MCH) 324 and a Paging Channel (PCH) 321.

The physical channels may also include a set of downlink and uplink channels. In some disclosed embodiments, the downlink physical channels 330-a may include a physical broadcast channel (PBCH) 332, a physical control format indicator channel (PCFICH) 331, a physical downlink control channel (PDCCH) 335, a physical hybrid ARQ indicator channel (PHICH) 333, a physical downlink shared channel (PDSCH) 334 and a physical multicast channel (PMCH) 336.

Uplink channelization hierarchy 300-b may illustrate, for example, channel mapping between logical channels 310, UL transport channels 320-b, and uplink physical channels 330-b for an LTE/LTE-A network. The UL transport channels 320-b may include a random access channel (RACH) 325, and an uplink shared data channel (UL-SCH) 326. The uplink physical channels 330-b may include at least one of a physical random access channel (PRACH) 337, a physical uplink control channel (PUCCH) 338, and a physical uplink shared channel (PUSCH) 339.

Figure 4:
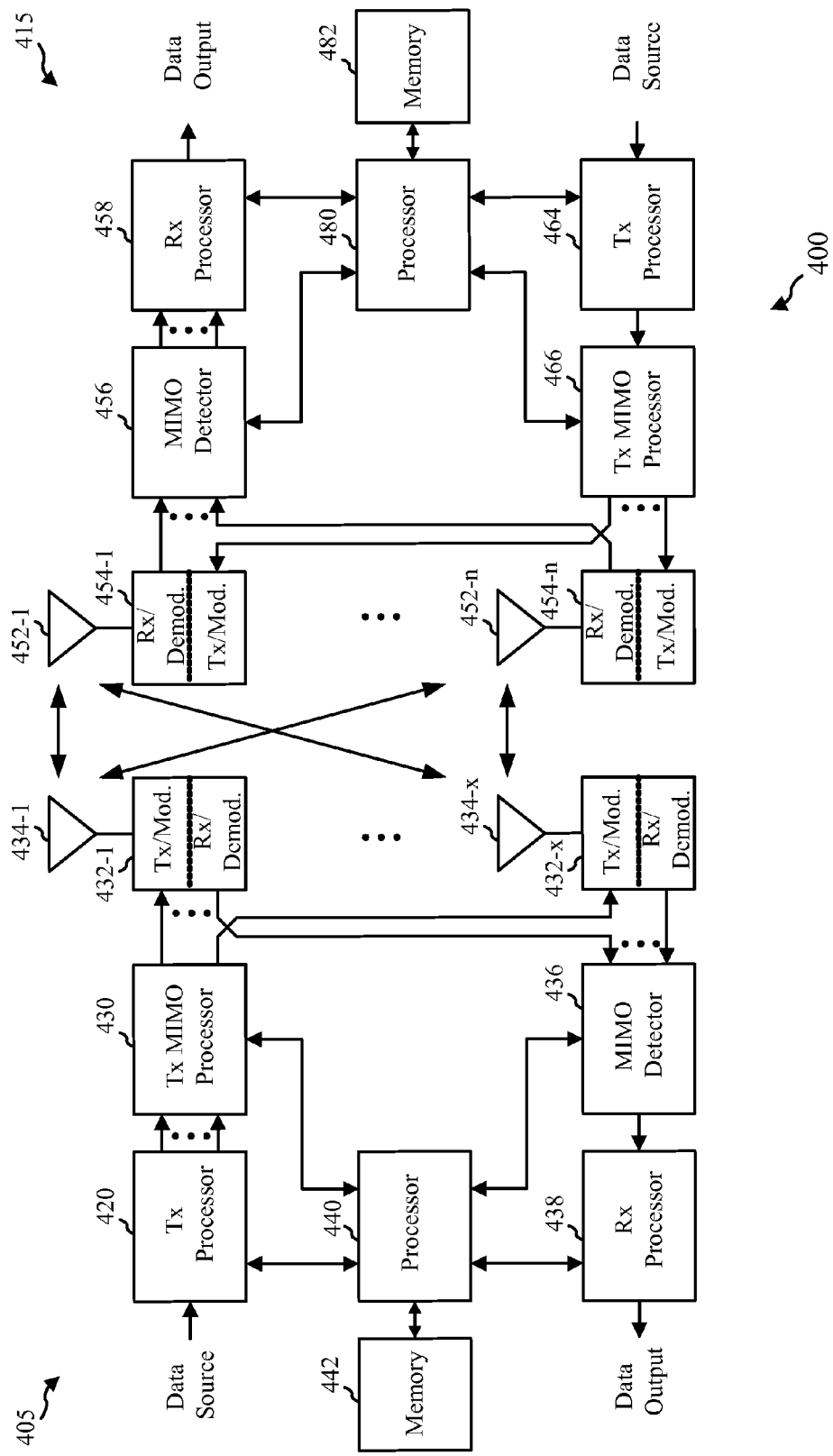
FIG. 4 is a block diagram conceptually illustrating a design of an eNodeB and a UE, in accordance with an aspect of the present disclosure.

FIG. 4 is a block diagram conceptually illustrating a design of an eNodeB 405 and a UE 415, in accordance with an aspect of the present disclosure. The eNodeB 405 and UE 415 may be part of a wireless communications system 400. This wireless communications system 400 may illustrate aspects of the wireless communications system 100 of FIG. 1 and/or the wireless communications system 200 of FIG. 2. For example, the eNodeB 405 may be an example of one or more of the eNodeBs 105, 205 described above with respect to FIGS. 1-3, and the UE 415 may be an example of one or more of the UEs 115, 215 described above with respect to FIGS. 1-3.

The eNodeB 405 may be equipped with eNodeB antennas 434-1 through 434-x, where x is a positive integer, and the UE 415 may be equipped with UE antennas 452-1 through 452-n. In the wireless communications system 400, the eNodeB 405 may be able to send data over multiple communication links at the same time. Each communication link may be called a "layer" and the "rank" of the communication link may indicate the number of layers used for communication. For example, in a 2×2 MIMO system where eNodeB 405 transmits two "layers," the rank of the communication link between the eNodeB 405 and the UE 415 is two.

At the eNodeB 405, an eNodeB transmit processor 420 may receive data from an eNodeB data source and control information from an eNodeB controller/processor 440. The control information may be for the PBCH, PCFICH, PHICH, PDCCH, etc. The data may be for the PDSCH, etc. The eNodeB transmit processor 420 may process (e.g., encode and symbol map) the data and control information to obtain data symbols and control symbols, respectively. The eNodeB transmit processor 420 may also generate reference symbols, e.g., for the PSS, SSS, and cell-specific reference signal. An eNodeB transmit (TX) MIMO processor 430 may perform spatial processing (e.g., precoding) on data symbols, control symbols, and/or reference symbols, if applicable, and may provide output symbol streams to the eNodeB modulators/demodulators 432-1 through 432-x. Each eNodeB modulator/demodulator 432 may process a respective output symbol stream (e.g., for OFDM, etc.) to obtain an output sample stream. Each eNodeB modulator/demodulator 432 may further process (e.g., convert to analog, amplify, filter, and upconvert) the output sample stream to obtain a downlink (DL) signal. In one example, DL signals from eNodeB modulators/demodulators 432-1 through 432-x may be transmitted via the eNodeB antennas 434-1 through 434-x, respectively.

At the UE 415, the UE antennas 452-1 through 452-n may receive the DL signals from the eNodeB 405 and may provide the received signals to the UE modulators/demodulators 454-1 through 454-n, respectively. Each UE modulator/demodulator 454 may condition (e.g., filter, amplify, downconvert, and digitize) a respective received signal to obtain input samples. Each UE modulator/demodulator 454 may further process the input samples (e.g., for OFDM, etc.) to obtain received symbols. A UE MIMO detector 456 may obtain received symbols from all the modulators/demodulators 454-1 through 454-n, perform MIMO detection on the received symbols if applicable, and provide detected symbols. A UE receiver (Rx) processor 458 may process (e.g., demodulate, deinterleave, and decode) the detected symbols, providing decoded data for the UE 415 to a data output, and provide decoded control information to a UE controller/processor 480, or UE memory 482.

On the uplink (UL), at the UE 415, a UE transmit processor 464 may receive and process data from a UE data source. The UE transmit processor 464 may also generate reference symbols for a reference signal. The symbols from the UE transmit processor 464 may be precoded by a UE transmit MIMO processor 466 if applicable, further processed by the UE modulators/demodulators 454-1 through 454-n (e.g., for SC-FDMA, etc.), and be transmitted to the eNodeB 405 in accordance with the transmission parameters received from the eNodeB 405. At the eNodeB 405, the UL signals from the UE 415 may be received by the eNodeB antennas 434, processed by the eNodeB modulators/demodulators 432, detected by an eNodeB MIMO detector 436 if applicable, and further processed by an eNodeB receiver processor 438. The eNodeB receiver processor 438 may provide decoded data to an eNodeB data output and to the eNodeB controller/processor 440. The components of the UE 415 may, individually or collectively, be implemented with one or more Application Specific Integrated Circuits (ASICs) adapted to perform some or all of the applicable functions in hardware. Each of the noted modules may be a means for performing one or more functions related to operation of the wireless communications system 400. Similarly, the components of the eNodeB 405 may, individually or collectively, be implemented with one or more Application Specific Integrated Circuits (ASICs) adapted to perform some or all of the applicable functions in hardware. Each of the noted components may be a means for performing one or more functions related to operation of the wireless communications system 400.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

In one configuration, the eNodeB 405 may operate as an anchor eNodeB 405 for the UE 415, and may include means for establishing a connection with the UE 415, means for determining whether a connection exists or is pending between the UE 415 and a second eNodeB (not shown), and means for transmitting a message to a mobility management entity (MME), where the message associates a network address for a local gateway of the second eNodeB with SIPTO connectivity for the UE 415. The message may include the network address for the local gateway of the second eNodeB. In one aspect, the aforementioned means may be the eNodeB controller/processor 440, the eNodeB memory 442, the eNodeB transmit processor 420, eNodeB receiver processor 438, the eNodeB modulators/demodulators 432, and the eNodeB antennas 434 of the eNodeB 405 configured to perform the functions recited by the aforementioned means.

In an additional or alternative configuration, the eNodeB 405 may operate as an anchor eNodeB 405 for the UE 415, and may include means for receiving a request to establish a bearer for the UE 415, means for determining whether the request or the requested bearer is associated with a SIPTO PDN connection for the UE 415 at a second eNodeB (not shown), means for communicating with the second eNodeB to establish the bearer in response to the determination that the request is to establish a bearer associated with the SIPTO PDN connection for the UE 415 at the second eNodeB, and means for establishing a radio bearer corresponding to the SIPTO PDN connection with the UE 415. In one aspect, the aforementioned means may be the eNodeB controller/processor 440, the eNodeB memory 442, the eNodeB transmit processor 420, eNodeB receiver processor 438, the eNodeB modulators/demodulators 432, and the eNodeB antennas 434 of the eNodeB 405 configured to perform the functions recited by the aforementioned means.

In an additional or alternative configuration, the eNodeB 405 may operate as an assisting eNodeB 405 for the UE 415, and may include means for receiving a request to establish a bearer for the UE 415 from another eNodeB (e.g., an anchor eNodeB, not shown), means for determining whether the request or the requested bearer is associated with a SIPTO PDN connection for the UE 415 at the eNodeB 405, means for determining radio bearer configuration parameters corresponding to the SIPTO PDN connection with the UE 415, and means for carrying offloaded network traffic associated with the PDN connection for the UE 415 to a local gateway of the eNodeB 405. In one aspect, the aforementioned means may be the eNodeB controller/processor 440, the eNodeB memory 442, the eNodeB transmit processor 420, eNodeB receiver processor 438, the eNodeB modulators/demodulators 432, and the eNodeB antennas 434 of the eNodeB 405 configured to perform the functions recited by the aforementioned means.

Figure 5A:
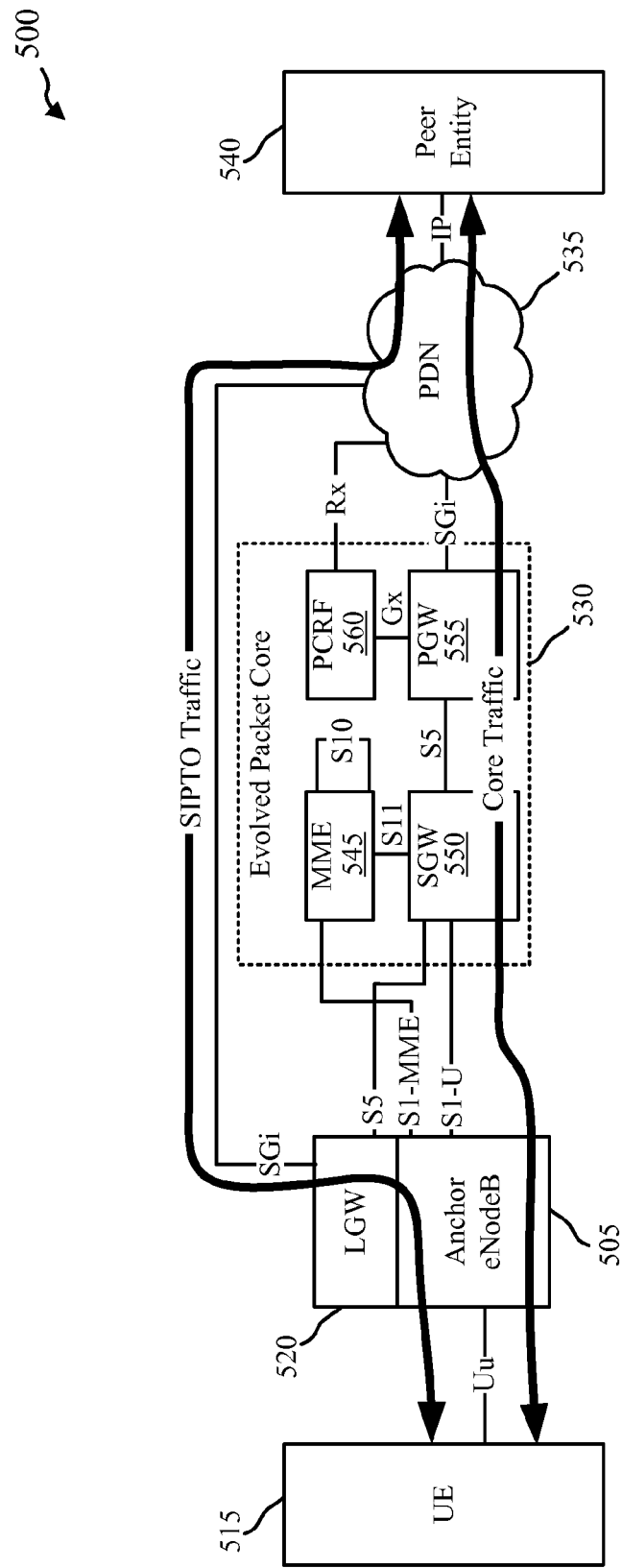
FIGS. 5A and 5B are block diagrams conceptually illustrating examples of data paths between a UE and a packet data network (PDN), in accordance with an aspect of the present disclosure.

FIG. 5A is a block diagram conceptually illustrating an example of data paths between a UE 515 and a PDN 535, in accordance with an aspect of the present disclosure. In the present example, a wireless communications system 500-a may include the UE 515, an anchor eNodeB 505 associated with a local gateway (LGW) 520, an evolved packet core (EPC) 530, a PDN 535, and a peer entity 540. The UE 515 may be an example of one or more of the UEs 115, 215, 415 described above with reference to previous Figures. The anchor eNodeB 505 may be an example of one or more of the eNodeBs 105, 205, 405 described above with reference to previous Figures. The EPC 530 may be an example of one or more of the core network 130 described above with reference to FIG. 1 or the EPC 209 described above with reference to FIG. 2. The PDN 535 may be an example of the PDN 210 described above with reference to FIG. 2.

The EPC 530 of the present example may include a mobility management entity (MME) 545, a serving gateway (SGW) 550, a PDN gateway (PGW) 555, and a policy charging and rules function (PCRF) 560. The mobility management entity 545 may be a control node that processes signaling between the UE 515 and the EPC 530. For example, the mobility management entity 545 may provide bearer and connection management for the UE 515. The mobility management entity 545 may be responsible for idle mode UE 515 tracking and paging, bearer activation and deactivation, and serving gateway 550 or local gateway 520 selection for the UE 515. The mobility management entity 545 may communicate with the anchor eNodeB 505, and may additionally authenticate the UE 515 and implement non-access stratum (NAS) signaling with the UE 515.

All user IP packets transmitted through the EPC 530 may be transferred through the serving gateway 550. The serving gateway 550 may reside in the user plane and act as a mobility anchor for inter-eNodeB handovers and handovers between different radio access technologies (RATs). The PDN gateway 555 may provide connectivity to one or more external packet data networks, such as PDN 535. The PDN 535 may include the Internet, an Intranet, an IP Multimedia Subsystem (IMS), a Packet-Switched (PS) Streaming Service (PSS), and/or other types of PDNs.

A number of communication interfaces may be in place to allow the various nodes of the wireless communications system 500-a to communicate with each other. The UE 515 may communicate with the anchor eNodeB 505 over an E-UTRAN Uu interface, which is the air interface associated with the LTE/LTE-A wireless communication systems. The anchor eNodeB 505 may communicate with the mobility management entity 545 over an S1-MME interface and with the serving gateway 550 over an S1-U interface. Within the EPC 530, the serving gateway 550 may communicate with PDN gateway 555 over an S5 interface and with the mobility management entity 545 over an S11 interface. The PCRF 560 may communicate with the PDN gateway 555 over a Gx interface to convey policy enforcement to the PDN gateway 555, and also to retrieve traffic flow data. The mobility management entity 545 may utilize an S10 interface to communicate with other mobility management entities 545 to support mobility management entity changes. The PDN gateway 555 may communicate with the PDN 535 over an SGi interface to communicatively couple the UE 515 to the PDN 535. The PCRF 560 may communicate with the PDN 535 over an Rx interface to receive policy data from applications over the PDN 535.

Where SIPTO is enabled at the anchor eNodeB 505, user-plane traffic between the UE 515 and the peer entity 540 may be diverted from the EPC 530 and offloaded to an SGi connection between the local gateway 520 of the anchor eNodeB 505 and the PDN 535. To support bearer traffic over the SGi connection between the local gateway 520 and the PDN 535, the local gateway 520 may communicate with the serving gateway 550 over an S5 interface. The SIPTO may be enabled for a PDN connection of the UE 515 during connectivity activation if the mobility management entity 545 determines, based on a set of network policies and/or subscription information for the UE 515, that SIPTO is permitted for the connection of the UE 515. Upon determining that SIPTO is permitted for the connection, the mobility management entity 545 may set up SIPTO bearers for the connection using the network address of the local gateway 520. The mobility management entity 545 may determine the network address of the local gateway 520 based on communication with the anchor eNodeB 505 (e.g., via S1 control messages), one or more operations administration and management (OAM) messages, or other communication sources. The SIPTO-eligible data traffic may flow to and from the UE 515 along the path labeled "SIPTO Traffic," as defined by the UE 515, the anchor eNodeB 505, the local gateway 520, and the PDN 535. Core data traffic (e.g., non-SIPTO traffic) may flow to and from the UE 515 along the path labeled "Core Traffic," as defined by the UE 515, the anchor eNodeB 505, the serving gateway 550, the PDN gateway 555, and the PDN 535.

Figure 5B:
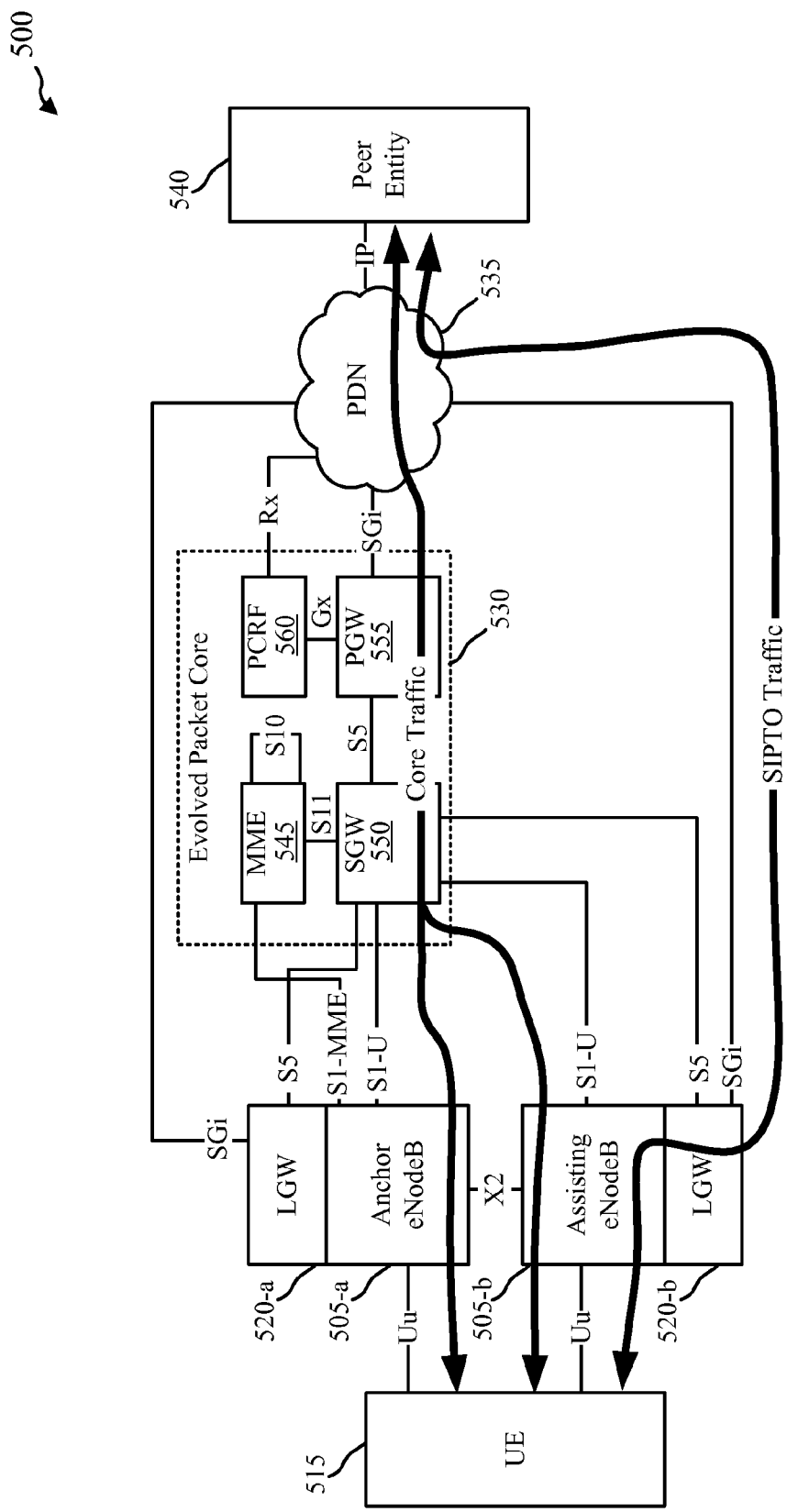

FIG. 5B is a block diagram conceptually illustrating another example of data paths between the UE 515 and the PDN 535 in accordance with an aspect of the present disclosure. Specifically, FIG. 5B illustrates the wireless communications system 500 of FIG. 5A as modified by the addition of an assisting eNodeB 505-b in communication with the UE 515, which may be used to carry SIPTO traffic for at least one SIPTO-enabled PDN connection of the UE 515 between the UE 515 and the PDN 535. The wireless communications system 500 of FIG. 5B may include both an anchor eNodeB 505-a and an assisting eNodeB 505-b, each of which is in communication with the UE 515 and a different local gateway 520-a, 520-b. In alternative examples, the anchor eNodeB 505-a may not necessarily be in communication with a local gateway 520-a.

In some cases, the SIPTO may be performed at the assisting eNodeB 505-b rather than the anchor eNodeB 505-a. For example, the anchor eNodeB 505-a may not have access to a local gateway for one or more SIPTO-permissible PDN connections of the UE 515. In other examples, the use of local gateway 520-b of the assisting eNodeB 505-b may lead to more balanced or efficient use of network resources.

In FIG. 5B, the assisting eNodeB 505-b may handle one or more SIPTO PDN connections for the UE 515. Thus, SIPTO-eligible data traffic may flow to and from the UE 515 along the path labeled "SIPTO Traffic," as defined by the UE 515, the assisting eNodeB 505-b, the local gateway 520-b of the assisting eNodeB 505-b, and the PDN 535. Core data traffic (e.g., non-SIPTO traffic) may flow to and from the UE 515 along the path labeled "Core Traffic," as defined by the UE 515, the anchor eNodeB 505-a or assisting eNodeB 505-b, the serving gateway 550, the PDN gateway 555, and the PDN 535. In additional examples, both the anchor eNodeB 505-a and the assisting eNodeB 505-b may concurrently handle different SIPTO PDN connections for the UE 515.

The present disclosure provides methods and techniques for a) establishing SIPTO PDN connections at an assisting eNodeB 505-b, b) deactivating the SIPTO PDN connection at the assisting eNodeB 505-b, and c) moving a SIPTO PDN connection from the anchor eNodeB 505-a to the assisting eNodeB 505-b or vice versa.

Establishing the SIPTO PDN Connection

The procedure for establishing a SIPTO PDN connection at the assisting eNodeB 505-b may begin with the UE 515 requesting a new PDN connection with an access point name (APN) for which SIPTO is permitted. The PDN connection may be requested using standard PDN connectivity activation procedures. The mobility management entity 545 may receive the request from the UE 515 and verify whether the UE 515 is permitted to use SIPTO for the requested PDN connection with the APN based on subscription information for the UE 515. The mobility management entity 545 may receive the subscription information for the UE 515 from, for example, a home subscriber server (HSS) (not shown) to verify whether the requested PDN connection with the APN is permitted.

Upon determining that the UE 515 is permitted to use SIPTO for the requested PDN connection having the APN, and that SIPTO is permitted generally for the PDN having the APN, the mobility management entity 545 may select the local gateway 520-*b* of the assisting eNodeB 505-*b* for establishing the requested PDN connection. The mobility management entity 545 may determine the network address of the local gateway 520-*b* for the assisting eNodeB 505-*b* in order to select the local gateway 520-*b* of the assisting eNodeB 505-*b* for establishing the requested PDN connection. For example, the anchor eNodeB 505-*a* may provide the network address of the local gateway 520-*b* for the assisting eNodeB 505-*b* to the mobility management entity 545. The anchor eNodeB 505-*a* may communicate with the assisting eNodeB 505-*b* to determine the network address of the local gateway 520-*b* of the assisting eNodeB 505-*b*. For example, the anchor eNodeB 505-*a* may communicate with the assisting eNodeB 505-*b* using an X2 common control messages (i.e. independent of UE context). The assisting eNodeB 505-*b* may provide the network address of its local gateway 520-*b* to the anchor eNodeB 505-*a* during a setup of the X2 interface or during an eNodeB Configuration Update procedure.

In additional or alternative examples, the assisting eNodeB 505-*b* may provide the network address of its local gateway 520-*b* to the anchor eNodeB 505-*a* over one or more X2 dedicated control messages (i.e. for a particular UE context). For example, the assisting eNodeB 505-*b* may provide the network address of its local gateway 520-*b* as part of a handover request acknowledge message during an X2 handover procedure. In additional or alternative examples, the anchor eNodeB 505-*a* may receive the network address of the local gateway 520-*b* of the assisting eNodeB 505-*b* from an operations, administration, and management (OAM) server, for example, during the configuration of the network. In additional or alternative examples, the anchor eNodeB 505-*a* may receive the network address of the local gateway 520-*b* of the assisting eNodeB 505-*b* over one or more S1 control messages from the assisting eNodeB 505-*b* to the mobility management entity 545, routed to the anchor eNodeB 505-*a* by the mobility management entity 545.

Once the anchor eNodeB 505-*a* determines the network address of the local gateway 520-*b* of the assisting eNodeB 505-*b*, the anchor eNodeB 505-*a* may convey the network address to the mobility management entity 545 in S1 control messages. In certain examples, the anchor eNodeB 505-*a* may include the network address of the local gateway 520-*b* of the assisting eNodeB 505-*b* in all S1 messages to the mobility management entity 545 that include a non-access stratum (NAS) message.

In some examples, the anchor eNodeB 505-*a* may determine whether to perform the SIPTO at the anchor eNodeB 505-*a* or the assisting eNodeB 505-*b*. For example, the anchor eNodeB 505-*a* may determine to perform the SIPTO at the assisting eNodeB 505-*b* in response to a determination that the local gateway of the assisting eNodeB 505-*b* has access to a packet data network associated with a connection of the UE 515 that is not available to the local gateway 520-*a* of the anchor eNodeB 505-*a*. In additional or alternative examples, the anchor eNodeB 505-*a* may determine to perform the SIPTO at the assisting eNodeB 505-*b* in response to a determination that the location of the local gateway 520-*b* of the assisting eNodeB 505-*b* is closer to the location of the UE 515 than the location of the local gateway 520-*a* of the anchor eNodeB 505-*a*. In still other examples, the anchor eNodeB 505-*a* may determine to perform the SIPTO at the assisting eNodeB 505-*b* in response to an inability to support SIPTO at the anchor eNodeB 505-*a*.

The anchor eNodeB 505-*a* may determine to perform the SIPTO at the assisting eNodeB 505-*b*, then replace the network address of its own local gateway 520-*a* with the network address of the local gateway 520-*b* of the assisting eNodeB 505-*b* in one or more S1 NAS transport messages for the UE 515 (e.g., when the UE connects to the assisting eNodeB 505-*b*, or when the anchor eNodeB 505-*a* decides to establish a UE connection at the assisting eNodeB 505-*b*). In certain examples, the one or more S1 NAS messages may include all S1 NAS messages from the anchor eNodeB 505-*a* to the mobility management entity 545. Thus, through the use of existing S1 messages between the anchor eNodeB 505-*a* and the mobility management entity 545, the use of the assisting eNodeB 505-*b* to establish the SIPTO connection may be transparent to the mobility management entity 545. In this case, the mobility management entity 545 may select to perform the SIPTO at the local gateway network address received from the anchor eNodeB 505-*a* that corresponds to the local gateway 520-*b* of the assisting eNodeB 505-*b*.

In certain examples, the S1 message(s) from the anchor eNodeB 505-*a* may trigger SIPTO activation at the assisting eNodeB 505-*b*. In additional or alternative examples, the anchor eNodeB 505-*a* may trigger SIPTO activation at the assisting eNodeB 505-*b* by moving an existing SIPTO PDN connection from the anchor eNodeB 505-*a* to the assisting eNodeB 505-*b*. The anchor eNodeB 505-*a* may do so by transmitting a PDN gateway-initiated bearer deactivation message to the UE 515 (irrespective of whether such deactivation was actually requested by the PDN gateway 555). The PDN gateway-initiated bearer deactivation message may indicate that reactivation of the PDN connection is requested, which may cause the UE 515 to request a replacement PDN connection. The replacement SIPTO PDN connection may then be established at the local gateway 520-*b* of the assisting eNodeB 505-*b* using the network address provided by the anchor eNodeB 505-*a* to the mobility management entity 545. These same principles may be applied (e.g., deactivating bearers with a request for reactivation to effectuate a move to a new local gateway 520) when offloading SIPTO PDNs between multiple assisting eNodeBs 505-*b* and/or moving SIPTO PDNs from the assisting eNodeB 505-*b* to the anchor eNodeB 505-*a*.

In other examples, the anchor eNodeB 505-*a* may provide the network address of its local gateway 520-*a* and the network address of the local gateway 520-*b* of the assisting eNodeB 505-*b* to the mobility management entity 545, and the mobility management entity 545 may determine whether to establish the SIPTO connection at the local gateway 520-*a* of the anchor eNodeB 505-*a* or at the local gateway 520-*b* of the assisting eNodeB 505-*b*. The anchor eNodeB 505-*a* may provide the network address of its local gateway 520-*a* and the network address of the local gateway 520-*b* of the assisting eNodeB 505-*b* to the mobility management entity 545 in one or more S1 NAS transport messages for the UE 515. In certain examples, the one or more S1 NAS transport messages for the UE 515 may include all S1 NAS transport messages for the UE 515.

The anchor eNodeB 505-*a* may, in some examples, indicate the types of nodes (e.g., anchor or assisting) to which each local gateway network address corresponds and/or information about where the UE 515 is currently connected in the S1 messages. The local gateway network addresses provided to the mobility management entity 545 may be updated whenever the UE 515 connects to or disconnects from an eNodeB 505. The mobility management entity 545 may determine whether to perform SIPTO at the anchor eNodeB 505-*a* or the assisting eNodeB 505-*b*, and then select the network address of the corresponding local gateway 520-*a* or 520-*b*. This decision may be based on one or more SIPTO permissions defined at the mobility management entity 545 for the connection. The permissions may include, for example, a preference for one of the anchor eNodeB 505-*a* or the assisting eNodeB 505-*b*. The preference may be defined based on subscription information for the UE 515 obtained from a home subscriber server (HSS). Additionally or alternatively, the preference may be defined based on a location of the UE 515, one or more SIPTO permissions of the UE 515 for that PDN, UE subscription location, policies indicating a preference for the anchor eNodeB 505-*a* or the assisting eNodeB 505-*b*, or other factors.

Once the mobility management entity 545 has the network address of the local gateway 520-*b* of the assisting eNodeB 505-*b*, the mobility management entity 545 may use the network address instead of DNS procedures for local gateway selection when the UE 515 requests SIPTO as part of an initial attach procedure or a UE-requested PDN connectivity procedure.

A SIPTO PDN connection may be established at the assisting eNodeB 505-*b* after the mobility management entity 545 selects the network address of the local gateway 520-*b* of the assisting eNodeB 505-*b* to perform SIPTO. For example, a direct path (e.g., user plane path) may be established between the assisting eNodeB 505-*b* and the local gateway 520-*b* of the assisting eNodeB 505-*b* for the SIPTO traffic.

Figure 6:
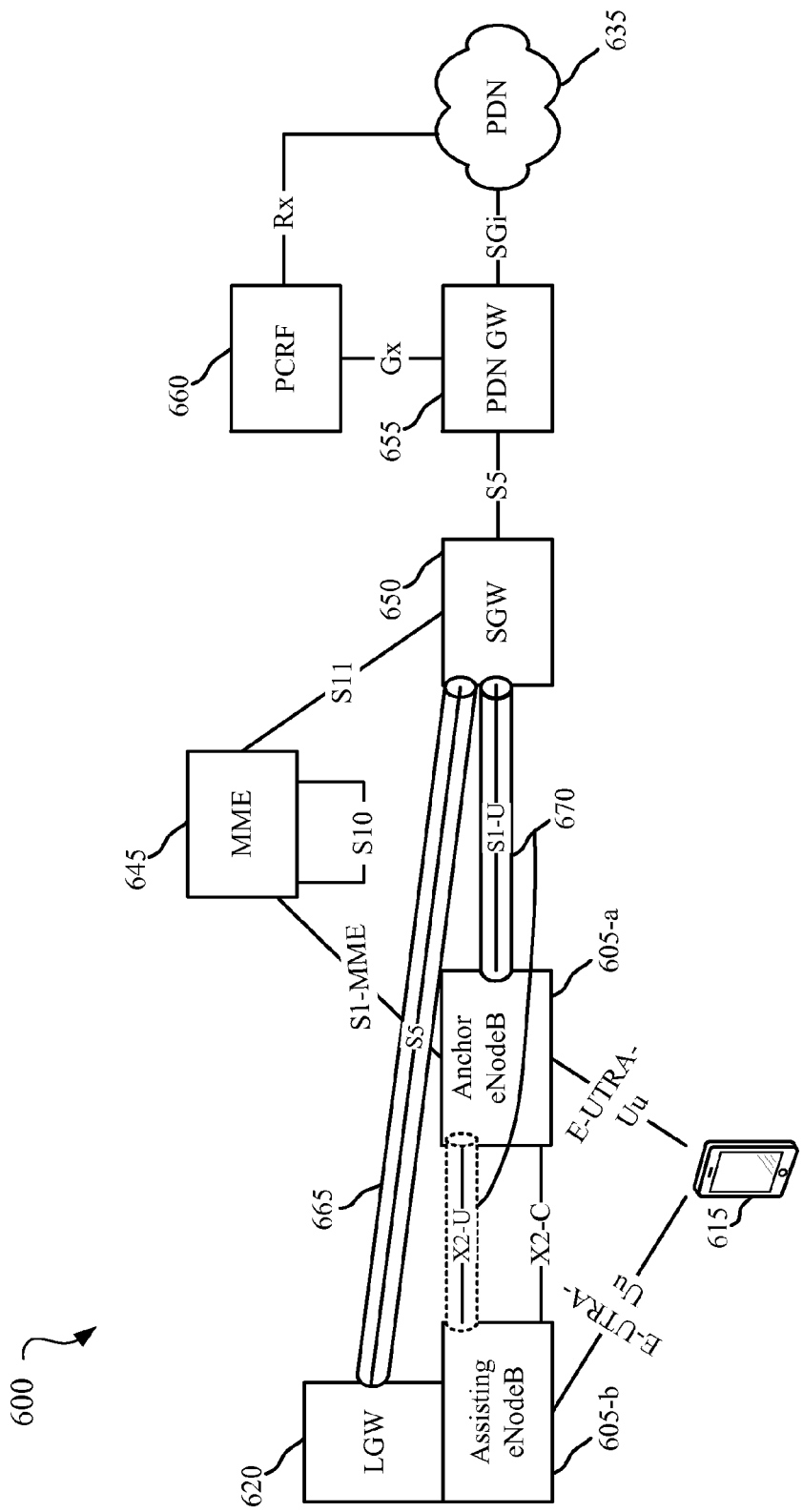
FIG. 6 is a block diagram conceptually illustrating examples of bearers associated with implementing SIPTO in a wireless communication system, in accordance with an aspect of the present disclosure.

FIG. 6 is a block diagram conceptually illustrating examples of bearers associated with implementing SIPTO in a wireless communications system 600, in accordance with an aspect of the present disclosure.

The wireless communications system 600 may include a UE 615 communicatively coupled with an anchor eNodeB 605-*a* and an assisting eNodeB 605-*b* over an E-UTRA Uu interface. The assisting eNodeB 605-*b* may be associated with a local gateway 620. The anchor eNodeB 605-*a* may be communicatively coupled with a mobility management entity 645 over an S1-MME interface, and a serving gateway 650 over an S1-U interface. The serving gateway 650 may be communicatively coupled with the mobility management entity 645 over an S11 interface and with a PDN gateway 655 over an S5 interface. The PDN gateway 655 may be communicatively coupled with a PCRF 660 over a Gx interface, and with a PDN 635 over an SGi interface. The PCRF 660 may also be communicatively coupled with the PDN 635 over an Rx interface. The wireless communications system 600 may be an example of one or more of the wireless communications systems 100, 200, 400, 500 described above with respect to the previous Figures. As such, one or more of the components of the wireless communications system 600 may be an example of one or more counterpart components described above with respect to the previous Figures.

A SIPTO PDN connection may be possible at the assisting eNodeB 605-*b* with the establishment of a direct path between the local gateway 620 of the assisting eNodeB 605-*b* and the assisting eNodeB 605-*b*. A first portion 665 of an EPS bearer may be established to provide a connection between the local gateway 620 of the assisting eNodeB 605-*b* and the serving gateway 650, and a second portion 670 of the EPS bearer may be established to provide a connection between the serving gateway 650 and the anchor eNodeB 605-*a*. The second portion 670 of the EPS bearer may also provide a connection between the anchor eNodeB 605-*a* and the assisting eNodeB 605-*b*.

To enable the aforementioned direct path, it may be useful for the local gateway 620 to know the mapping or correlation of the first portion 665 of the EPS bearer with the second portion 670 of the EPS bearer. As such, a correlation ID or other identifying parameter may be determined for both the first portion 665 and the second portion 670 of the EPS bearer and provided to the assisting eNodeB 605-*b* or the local gateway 620 when the EPS bearer is set up. For example, the correlation ID may be an identifier assigned to the EPS bearer by the serving gateway 650 that is sent in an S1 message during the establishment of the second portion 670 of the EPS bearer to uniquely identify the mapping or correlation between the first portion 665 of the EPS bearer and the second portion 670 of the EPS bearer at the serving gateway 650. For example, the correlation ID may be sent in an initial context setup request S1 message for a SIPTO PDN connection created during the attach procedure or in the bearer setup request for UE-requested PDN connectivity, as implemented in LTE and similar standards. The correlation ID may be provided by the anchor eNodeB 605-*a* to the assisting eNodeB 605-*b* via messaging over the X2-U or X2-C interface.

In certain examples, the segment of the second portion 670 of the EPS bearer over the X2-U interface between the anchor eNodeB 605-*a* and the assisting eNodeB 605-*b* may be rarely exerted (or used for data delivery as illustrated by the dashed lines). The X2-U segment of the second portion 670 of the EPS bearer may be exerted in some cases when the UE needs to be paged from RRC-IDLE mode. For this case, various options may be available. For example, the first option may be for the assisting eNodeB 605-*b* to cache data received by the local gateway 620 before the UE 615 wakes up from paging. The assisting eNodeB 605-*b* may deliver the cached data directly to the UE 615 after the UE 615 wakes up. In an additional or alternative set of examples, the second portion 670 of the EPS bearer may be set up over a direct S1-U path (not shown) between the serving gateway 650 and the assisting eNodeB 605-*b*. The anchor eNodeB 605-*a* may provide the transport layer address (TLA) and tunnel endpoint identifier (TEID) for terminating the S1-U path of the second portion 670 of the EPS bearer to the serving gateway 650 to establish the direct S1-U path between the serving gateway 650 and the assisting eNodeB 605-*b*. Also, the wireless communications system 600 may support S1-U termination in the assisting eNodeB 605-*b* regardless of SIPTO support at the assisting eNodeB 605-*b* in order to establish the direct path S1-U between the serving gateway 650 and the assisting eNodeB 605-*b*. In an additional or alternative set of examples, the second portion 670 of the EPS bearer may be terminated at the anchor eNodeB 605-*a*, and the S1-U portion between the anchor eNodeB 605-*a* and assisting eNodeB 605-*b* may be set up similarly for data packet forwarding. This option may be available in examples where the system configuration only supports S1-U termination in the anchor eNodeB 605-*a* aside from SIPTO support at the assisting eNodeB 605-*b*.

Figure 7:
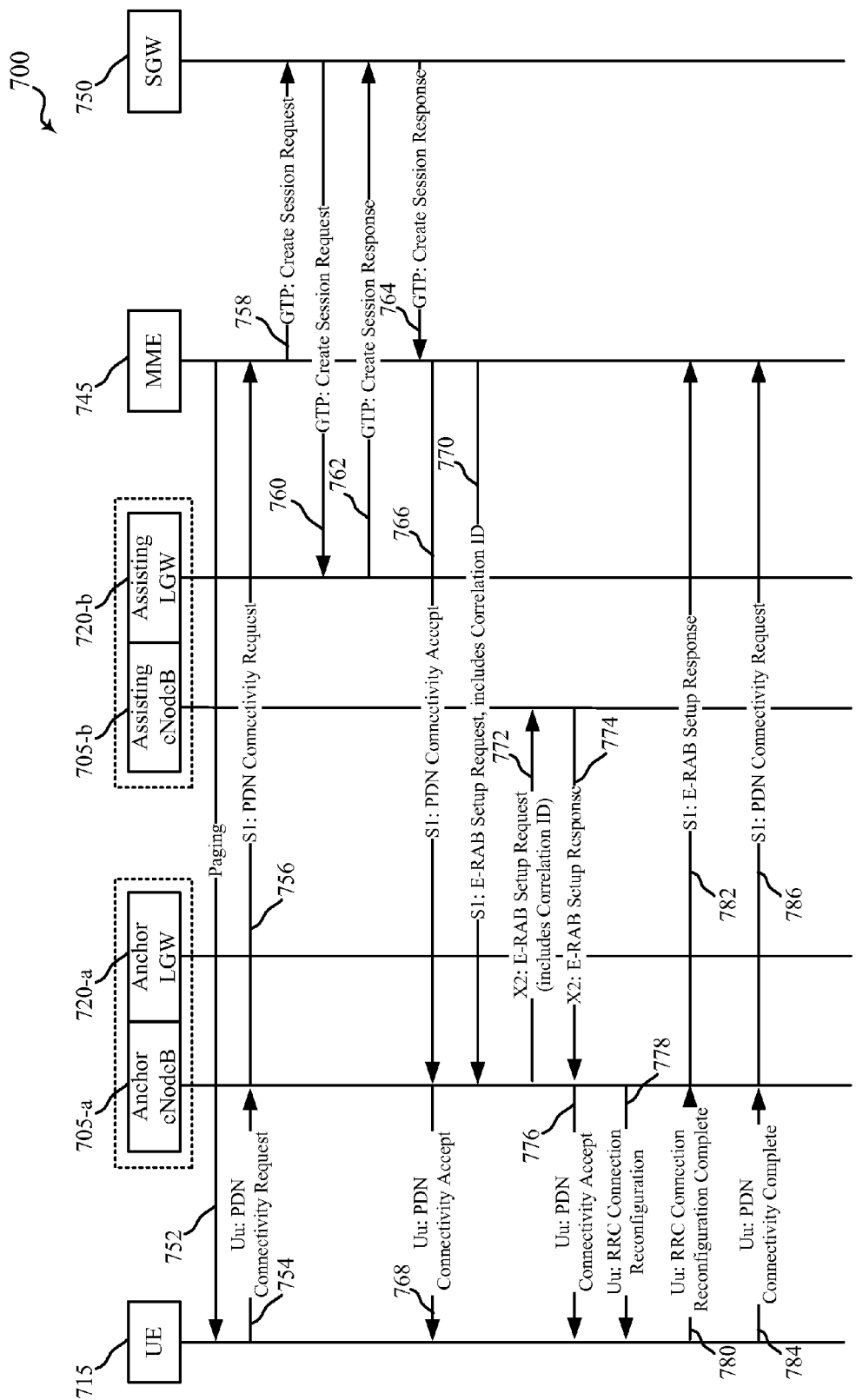
FIG. 7 is a block diagram conceptually illustrating an example of communications between nodes of a wireless communication system to set up bearers for a SIPTO PDN connection at an assisting eNodeB, in accordance with an aspect of the present disclosure.

FIG. 7 is a block diagram conceptually illustrating an example of communications between nodes of a wireless communications system 700 to set up bearers for a SIPTO PDN connection at an assisting eNodeB 705-*b*, in accordance with an aspect of the present disclosure. The wireless communications system 700 may include a UE 715, an anchor eNodeB 705-a and an associated local gateway 720-a (the "anchor local gateway 720-a"), an assisting eNodeB 705-b and an associated local gateway 720-b (the "assisting local gateway 720-b"), a mobility management entity 745, and a serving gateway 750. The wireless communications system 700 may be an example of one or more of the wireless communications systems 100, 200, 400, 500, 600 described above with respect to the previous Figures. As such, one or more of the components of the wireless communications system 700 may be an example of one or more counterpart components described above with respect to the previous Figures.

The procedure for setting up the SIPTO PDN connection may begin with the mobility management entity 745 paging 752 the UE 715. Following the paging, the UE 715 may transmit over the Uu interface a PDN connectivity request message 754 to the anchor eNodeB 705-a, which may transmit an S1 version of the PDN connectivity request message 756 to the mobility management entity 745. The mobility management entity 745 may transmit a create session request message 758 via a general packet radio service (GPRS) tunneling protocol (GTP) to the serving gateway 750.

The create session request message 758 transmitted to the serving gateway 750 may include the network address of the assisting local gateway 720-b, as provided by the anchor eNodeB 705-a or determined at the mobility management entity 745. The serving gateway 750 may then transmit a GTP create session request message 760 to the assisting local gateway 720-b having the network address specified in the create session request message 758 to set up a first portion of an EPS bearer (e.g., the first portion 665 of the EPS bearer of FIG. 6) between the serving gateway 750 and the assisting local gateway 720-b. Following the creation of the first portion of the EPS bearer, the assisting local gateway 720-b may transmit a GTP create session response 762 confirming the establishment of the first portion of the EPS bearer to the serving gateway 750. The serving gateway 750 may transmit a GTP create session response message 764 to the mobility management entity 745. The GTP create session response 764 transmitted to the mobility management entity 745 may include the correlation ID assigned by the serving gateway 750 to the first portion of the EPS bearer.

The mobility management entity 745 may then transmit an S1 PDN connectivity accept 766 message to the anchor eNodeB 705-a, which may forward the PDN connectivity accept message 768 to the UE 715 over the Uu interface. The mobility management entity 745 may concurrently or separately transmit an S1 E-RAB setup request message 770 to the anchor eNodeB 705-a, including the correlation ID assigned to the first portion of the EPS bearer. The S1 E-RAB setup request 770 may create a new E-RAB bearer (including a new radio bearer and S1 bearer) to support a second portion of the EPS bearer (e.g., the second portion 670 of the EPS bearer of FIG. 6) having a path between the serving gateway 750 and the UE 715 associated with the SIPTO PDN connection. The anchor eNodeB 705-a may determine that the E-RAB setup request message 770 corresponds to a SIPTO bearer at the assisting eNodeB 705-b and forward the S1 E-RAB setup request message 772 to the assisting eNodeB 705-b over the X2 interface. In additional or alternative examples, the anchor eNodeB 705-a may send an X2 message to the assisting eNodeB 705-b that may contain the configuration information (including the correlation ID) needed by the assisting eNodeB 705-b to establish the second EPS bearer.

The information for the radio bearer setup and configuration corresponding to the SIPTO PDN at the assisting eNodeB 705-b may be determined by the anchor eNodeB 705-a or the assisting eNodeB 705-b. For example, when the radio bearer configuration information is determined by the anchor eNodeB 705-a, the anchor eNodeB 705-a may transmit the radio bearer configuration information to the assisting eNodeB 705-b over the X2 interface. The radio bearer configuration information may be embedded in RRC messages or direct X2 messages (e.g., the E-RAB setup request message 772). The assisting eNodeB 705-b then sets up the radio bearer to support the requested E-RAB bearer, and transmits an E-RAB setup response message 774 over the X2 interface to the anchor eNodeB 705-a. The E-RAB setup response message 774 may include any remaining radio bearer configuration information not provided by the anchor eNodeB 705-a. In another example, when the radio bearer configuration information are determined by the assisting eNodeB 705-b, the assisting eNodeB 705-b may supply radio bearer configuration information to the anchor eNodeB 705-a over the X2 interface (embedded in RRC messages or in direct X2 messages) for transmission to the UE 715. For example, the assisting eNodeB 705-b may provide the radio bearer configuration information to the anchor eNodeB 705-b via the E-RAB setup response message 774.

The anchor eNodeB 705-a may transmit a PDN connectivity accept message 776 and an RRC connection reconfiguration message 778 over the Uu interface to the UE 715. The RRC connection reconfiguration message 778 may configure the UE 715 for the new SIPTO PDN connection by establishing the radio bearer with the UE 715. The communication from the anchor eNodeB 705-a to the UE 715 may further include a non-access stratum (NAS) message to establish the NAS component of the bearer at the UE 715. The UE 715 may respond with an RRC connection reconfiguration complete message 780 over the Uu interface, and the anchor eNodeB 705-a may transmit an S1 E-RAB setup response message 782 to the mobility management entity 745. The UE 715 may also respond with a PDN connectivity complete message 784 over the Uu interface, and the anchor eNodeB 705-a may transmit an S1 PDN connectivity complete message 786 to the mobility management entity 745.

Deactivating a SIPTO PDN Connection at the Assisting eNodeB

Figure 8:
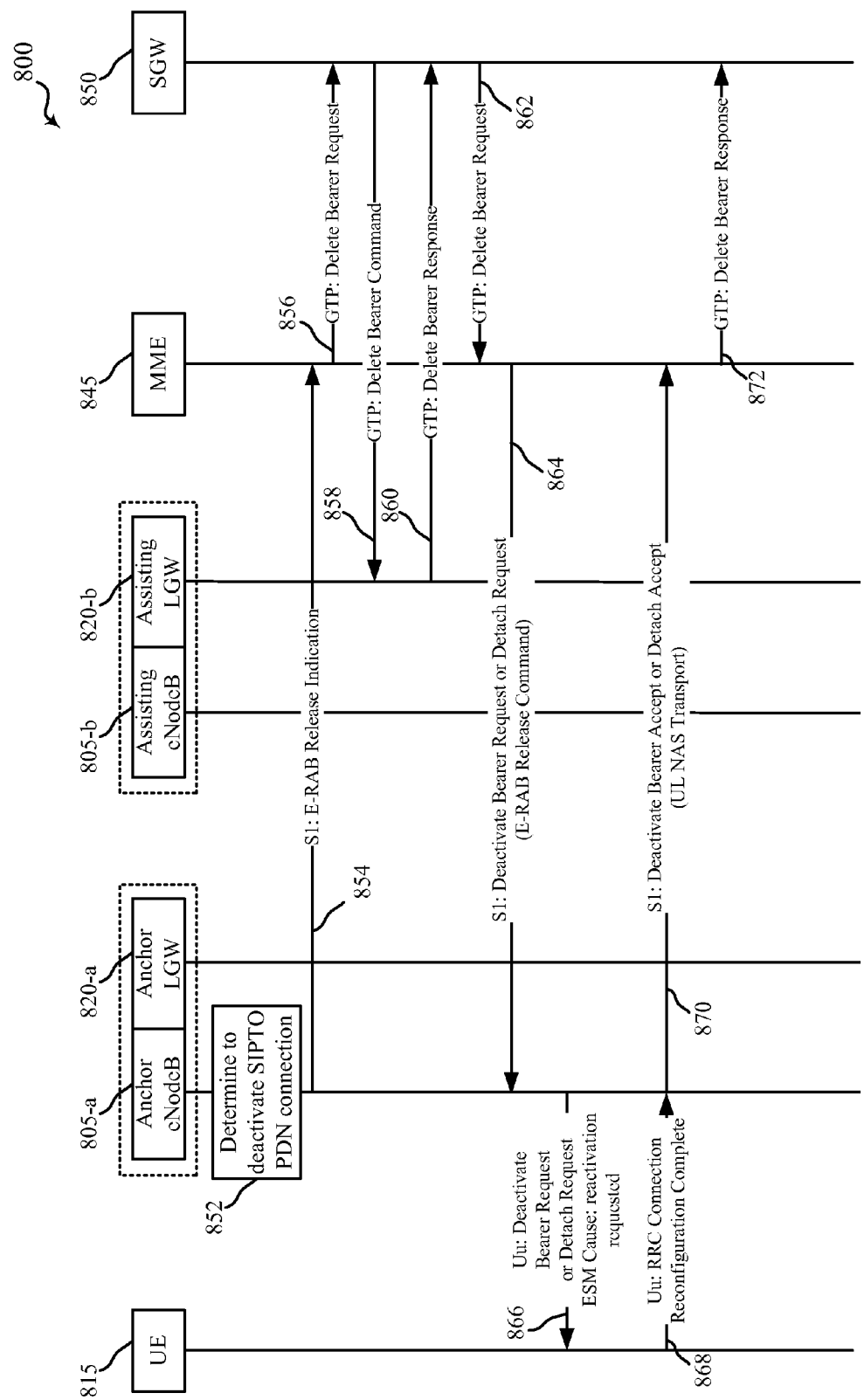
FIG. 8 is a block diagram conceptually illustrating an example of communications in a wireless communication system to deactivate a SIPTO PDN connection, in accordance with an aspect of the present disclosure.

FIG. 8 is a block diagram conceptually illustrating an example of communications in a wireless communications system 800 to deactivate a SIPTO connection, in accordance with an aspect of the present disclosure. The wireless communications system 800 may include a UE 815, an anchor eNodeB 805-a and an associated local gateway 820-a (the "anchor local gateway 820-a"), an assisting eNodeB 805-b and an associated local gateway 820-b (the "assisting local gateway 820-b"), a mobility management entity 845, and a serving gateway 850. The wireless communications system 800 may be an example of one or more of the wireless communications systems 100, 200, 400, 500, 600, 700 described above with respect to the previous Figures. As such, one or more of the components of the wireless communications system 800 may be an example of one or more counterpart components described above with respect to the previous Figures.

A SIPTO PDN connection at the assisting eNodeB 805-*b* may be deactivated when the wireless communications system 800 is no longer able to support the offload of traffic for the PDN connection at the assisting eNodeB 805-*b*. The anchor eNodeB 805-*a*, the assisting eNodeB 805-*b*, or the mobility management entity 845 may make the decision to deactivate the SIPTO PDN connection. In the example of FIG. 8, the anchor eNodeB 805-*a* initiates the deactivation.

The procedure begins at block 852, where the anchor eNodeB 805-*a* may determine to deactivate the SIPTO PDN connection at the assisting eNodeB 805-*b*. The anchor eNodeB 805-*a* may determine to deactivate the SIPTO PDN connection based on one or more of a number of possible factors. For example, the anchor eNodeB 805-*a* may identify a different assisting eNodeB (not shown) to handle the SIPTO PDN connection or determine to support the SIPTO PDN connection itself. In additional or alternative examples, the anchor eNodeB 805-*a* may determine (e.g., from its mobility control radio resource management (RRM) function) that the UE 815 has moved outside the geographic coverage area of the assisting eNodeB 805-*b*, and/or that the there has been a failure to maintain a QoS level at the assisting eNodeB 805-*b* (e.g., due to admission control or loading), to deactivate the SIPTO PDN connection at the assisting eNodeB 805-*b*. In certain examples, the anchor eNodeB 805-*a* may determine to deactivate the SIPTO PDN connection based at least in part on information provided by the assisting eNodeB 805-*b*. For example, the assisting eNodeB 805-*b* may provide information to the anchor eNodeB 805-*a* through X2 control plane messaging (e.g., providing loading information or explicitly informing the anchor eNodeB 805-*a* that bearers cannot be scheduled anymore).

In the present example, the anchor eNodeB 805-*a* may request that the mobility management entity 845 deactivate SIPTO PDN connection by sending an E-RAB release message 854 to the mobility management entity 845. For example, the anchor eNodeB 805-*a* may indicate a need for reestablishment in the E-RAB release message 854 to the mobility management entity 845. The mobility management entity 845 may then transmit a GTP delete bearer request message 856 to the serving gateway 850 instructing the serving gateway 850 to remove the bearers associated with the SIPTO PDN connection. The serving gateway 850 may transmit a GTP delete bearer command message 858 to the assisting local gateway 820-*b* to remove the first portion of the EPS bearer (e.g., the first portion 665 of the EPS bearer of FIG. 6) between the serving gateway 850 and the assisting local gateway 820-*b*. The assisting local gateway 820-*b* may then transmit a GTP delete bearer response message 860 to the serving gateway 850 to confirm that the first portion of the EPS bearer has been removed.

The serving gateway 850 may then transmit a GTP delete bearer request message 862 to the mobility management entity 845 to remove the second portion of the EPS bearer (e.g., the second portion 670 of the EPS bearer of FIG. 6) between the UE 815 and the serving gateway 850. The mobility management entity 845 may then transmit an S1 deactivate bearer request or detach request message 864 to the anchor eNodeB 805-*a* which may include an E-RAB release command. The anchor eNodeB 805-*a* may transmit a deactivate bearer request or a detach request message 866 to the UE 815 over the Uu interface. The deactivate bearer request or detach request message 866 to the UE 815 may include a specified EPS Session Management (ESM) cause code specifying a predefined cause associated with the deactivation of the bearer. In the present example, the ESM cause may specify that reactivation is requested, signaling to the UE 815 to re-request the PDN connection, thereby triggering reactivation of the EPS bearer. The UE 815 may remove the radio bearer associated with the second EPS bearer and respond to the anchor eNodeB 805-*a* with a RRC connection reconfiguration complete message 868. The anchor eNodeB may then transmit an S1 deactivate bearer accept or detach accept message 870 to the mobility management entity 845, which may include an uplink non-access stratum (NAS) transport message. The mobility management entity 845 may then transmit a GTP delete bearer response message 872 to the serving gateway 850, indicating that the second EPS bearer associated with the SIPTO PDN connection has been released. At that point, the UE 815 may be able to request reactivation of the PDN connection to the anchor eNodeB 805-*a*, and the replacement PDN connection may be established according to a new SIPTO configuration chosen by the anchor eNodeB 805-*a* and/or the mobility management entity 845.

In additional or alternative examples, the assisting eNodeB 805-*b* may determine to deactivate the SIPTO PDN connection by initiating PDN gateway-initiated bearer deactivation procedures. For example, the assisting eNodeB 805-*b* may use a PDN gateway-initiated bearer deactivation procedures as those defined for LTE/LTE-A systems, at the assisting local gateway 820-*b* for the SIPTO bearer. The assisting eNodeB 805-*b* may inform the anchor eNodeB 805-*a* to deactivate the SIPTO PDN connection via X2-C messaging with a cause value. The cause value specified with the request to deactivate the SIPTO PDN connection may prevent a ping-pong effect when the assisting eNodeB 805-*b* deactivates the SIPTO PDN connection and the anchor eNodeB 805-*a* tries to reactivate the SIPTO PDN connection. The assisting eNodeB 805-*b* may inform the mobility management entity 845 of its decision to deactivate the SIPTO PDN connection. For example, the assisting eNodeB 805-*b* may cause the assisting local gateway 820-*b* to provide a Delete Bearer Request message to the mobility management entity 845 via the SGW interface. The assisting eNodeB 805-*b* may determine to deactivate the SIPTO PDN connection, for example, upon determining that the traffic routed via the SIPTO PDN connection can no longer be scheduled. For example, the assisting eNodeB 805-*b* may determine that the bearer of the SIPTO PDN connection is scheduled only on the assisting eNodeB 805-*b* and that the UE 815 is out-of-sync with the assisting eNodeB 805-*b*. Additionally or alternatively, the assisting eNodeB 805-*b* may determine to deactivate the SIPTO PDN connection due to load, QoS or admission control, or poor RF conditions of the UE 815 at the assisting eNodeB 805-*b*.

In additional or alternative examples, the mobility management entity 845 may determine to deactivate the SIPTO PDN connection. The mobility management entity 845 may determine when to deactivate the SIPTO PDN connection based at least in part on the S1-MME messages. For example, the mobility management entity 845 may deactivate the SIPTO PDN connection when it detects that the UE 815 has moved away from the assisting eNodeB 805-*b*. For example, the mobility management entity 845 may deactivate the SIPTO PDN connection at the assisting eNodeB 805-*b* if the mobility management entity 845 detects that the anchor eNodeB 805-*a* and assisting eNodeB 805-*b* have changed for the UE 815 (e.g., in response to receiving an S1 path switch request message or initial UE messages from the new eNodeB). The mobility management entity 845 may initiate deactivation of the SIPTO PDN connection by transmitting the GTP delete bearer request message 856 to the serving gateway 850.

Moving a SIPTO PDN Connection Between eNodeBs

Figure 9:
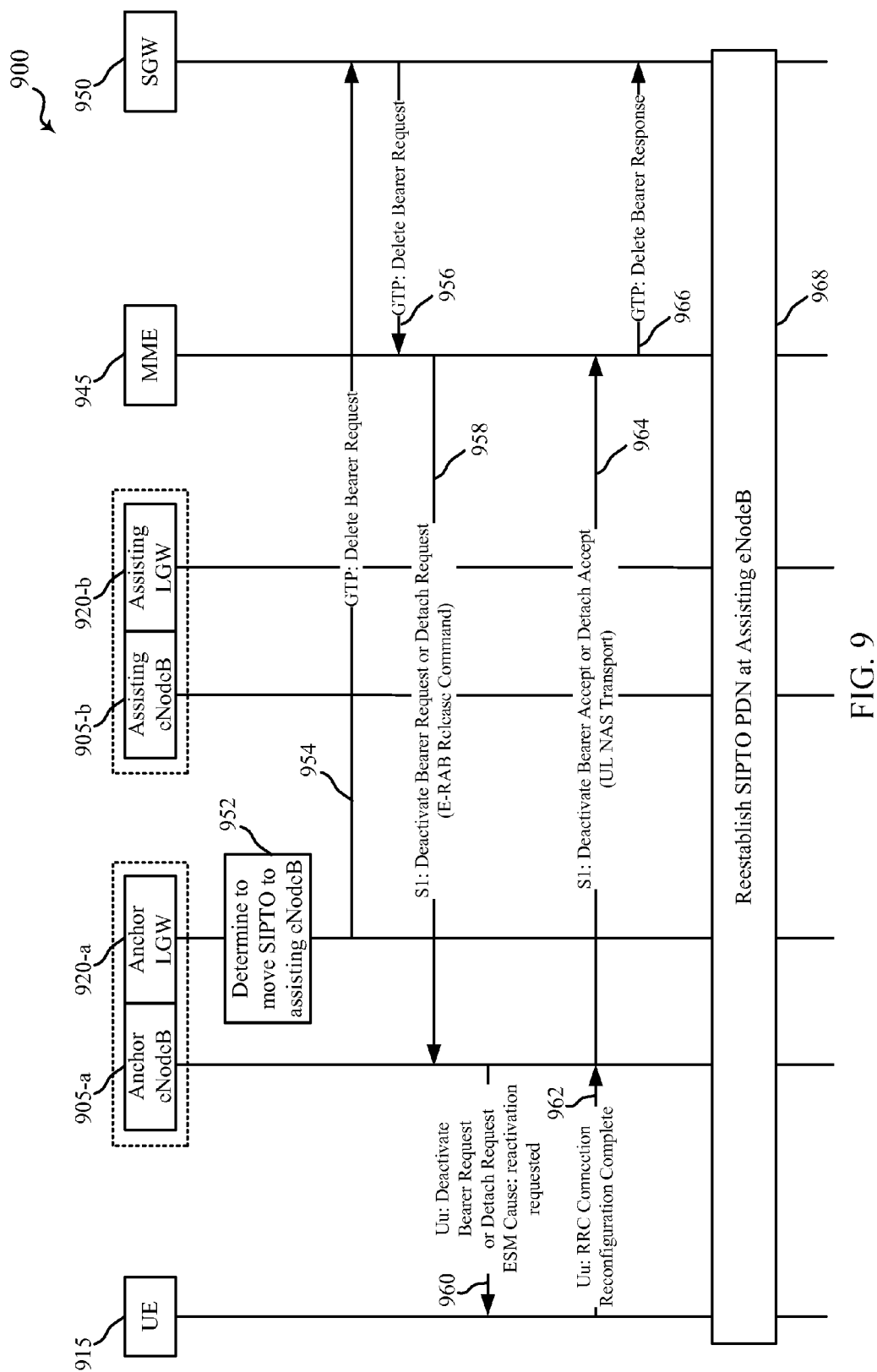
FIG. 9 is a block diagram conceptually illustrating an example of communications in a wireless communication system to move a SIPTO PDN connection from an anchor eNodeB to an assisting eNodeB, in accordance with an aspect of the present disclosure.

FIG. 9 is a block diagram conceptually illustrating an example of communications in a wireless communications system 900 to move a SIPTO PDN connection from an anchor eNodeB 905-*a* to an assisting eNodeB 905-*b*, in accordance with an aspect of the present disclosure. The wireless communications system 900 may include a UE 915, an anchor eNodeB 905-*a* and an associated local gateway 920-*a* (the "anchor local gateway 920-*a*"), an assisting eNodeB 905-*b* and an associated local gateway 920-*b* (the "assisting local gateway 920-*b*"), a mobility management entity 945, and a serving gateway 950. The wireless communications system 900 may be an example of one or more of the wireless communications systems 100, 200, 400, 500, 600, 700, 800 described above with respect to the previous Figures. As such, one or more of the components of the wireless communications system 900 may be an example of one or more counterpart components described above with respect to the previous Figures.

The procedure of FIG. 9 begins with the anchor local gateway 920-*a* determining (block 952) to move the SIPTO PDN connection for the UE 915 from the anchor local gateway 920-*a* to the assisting local gateway 920-*b* associated with the assisting eNodeB 905-*b*. This decision may be based on one or more factors observed by the anchor eNodeB 905-*a* or anchor local gateway 920-*a*. For example, the anchor eNodeB 905-*a* may determine (e.g., from its mobility control radio resource management (RRM) function) that there has been a failure to maintain a QoS level at the anchor local gateway 920-*a* (e.g., due to admission control or loading), that the assisting local gateway 920-*b* is a better match for the location of the UE 915, or other factors. In certain examples, the anchor eNodeB 905-*a* may be assisted by the assisting eNodeB 905-*b* in its decision to move the SIPTO PDN connection (e.g., through X2 control plane messaging providing information about the capabilities or loading of the assisting local gateway 920-*b* and assisting eNodeB 905-*b*).

Upon determining to move the SIPTO PDN connection to the assisting local gateway 920-*b*, the anchor local gateway 920-*a* may transmit a GTP delete bearer request message 954 to the serving gateway 950 requesting that the first EPS bearer (e.g., the first portion 665 of the EPS of FIG. 6) between the serving gateway 950 and the assisting local gateway 920-*b* corresponding to the SIPTO PDN connection be deleted. The serving gateway 950 may delete the first EPS bearer and transmit a GTP delete bearer request message 956 to the mobility management entity 945 to delete the second EPS (e.g., the second portion 670 of the EPS bearer of FIG. 6) between the serving gateway 950 and the UE 915 corresponding to the SIPTO PDN connection. The mobility management entity 945 may then transmit an S1 deactivate bearer request or detach request message 958 to the anchor eNodeB 905-*a*. The deactivate bearer request or detach request message 958 may include an E-RAB release command for the second EPS bearer corresponding to the SIPTO PDN connection.

The anchor eNodeB 905-*a* may transmit a deactivate bearer request or detach request message 960 to the UE 915 over the Uu interface to tear down the radio bearer associated with the second EPS bearer of the SIPTO PDN connection. The deactivate bearer request or detach request message 960 may indicate an EPS session management (ESM) cause indicating that reactivation of the SIPTO PDN connection is requested. Upon releasing the radio bearer associated with the second EPS bearer of the SIPTO PDN connection, the UE 915 may transfer an RRC connection reconfiguration complete message 962 to the anchor eNodeB 905-*a* over the Uu interface. The anchor eNodeB 905-*a* may then transmit an S1 deactivate bearer accept or detach accept message 964 to the mobility management entity 945 indicating that the second EPS bearer of the SIPTO PDN connection has been deactivated. The deactivate bearer accept or detach accept message 964 may include an uplink non-access stratum (NAS) transport message. The mobility management entity 945 may then transmit a GTP delete bearer response message 966 to the serving gateway 950 confirming the deletion of the second EPS bearer.

Because reactivation of the SIPTO PDN connection is requested by the anchor eNodeB 905-*a* in the deactivate bearer request or detach request message 960 to the UE 915, the UE 915 may request reestablishment of the PDN connection at block 968. The mobility management entity 945 may determine that the PDN connection qualifies for SIPTO and set up the SIPTO PDN connection at the network address of the assisting local gateway 920-*b*, consistent with the procedure defined in FIG. 7.

While the SIPTO PDN connection of FIG. 9 is moved from the anchor eNodeB 905-*a* to the assisting eNodeB 905-*b*, the similar procedures may be used to move a SIPTO PDN connection from the assisting eNodeB 905-*b* to the anchor eNodeB 905-*a* or between two assisting eNodeBs 905-*b*. By tearing down the bearers associated with the SIPTO PDN connection and requesting reactivation of the PDN connection at the UE 915, the UE 915 may attempt to reestablish the PDN connection, and the mobility management entity 945 may configure the PDN connection for SIPTO at the network address of the local gateway (e.g., the anchor local gateway 920-*a* or the assisting local gateway 920-*b*) selected by the anchor eNodeB 905-*a*, a previous assisting eNodeB 905-*b*, or the mobility management entity 945 itself.

Figure 10:
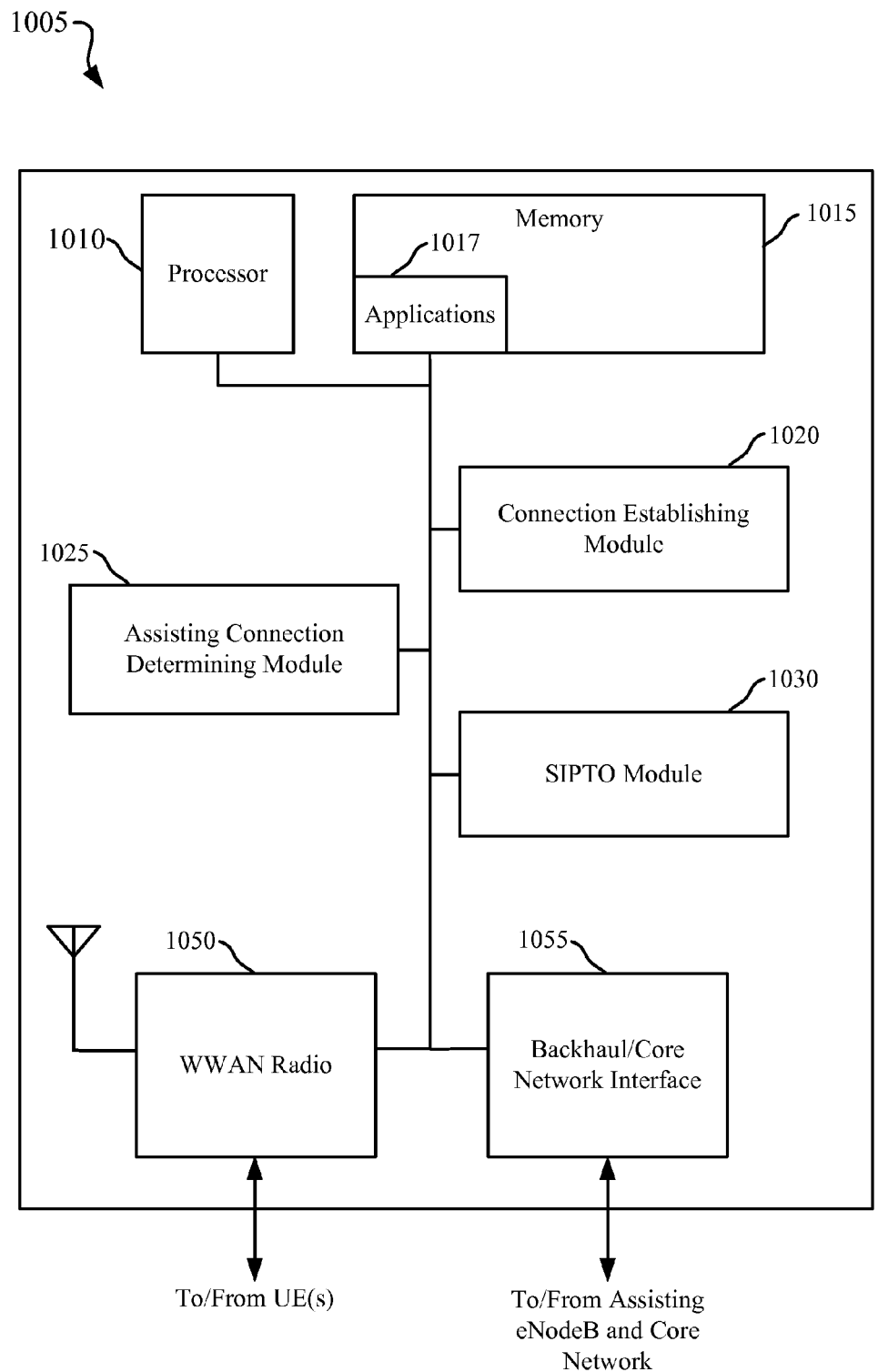
FIG. 10 is a block diagram conceptually illustrating an example of an anchor eNodeB, in accordance with an aspect of the present disclosure.

FIG. 10 is a block diagram conceptually illustrating an example of an anchor eNodeB 1005, in accordance with an aspect of the present disclosure. The anchor eNodeB 1005 may be an example of one or more of the eNodeBs 105, 205, 405, 505, 605, 705, 805, 905 described above with reference to the previous Figures.

The anchor eNodeB 1005 of FIG. 10 may include a processor 1010, a memory 1015, a connection establishing module 1020, an assisting connection determining module 1025, a SIPTO module 1030, a WWAN radio 1050, and a backhaul/core network interface 1055. Each of these components may be in communication, directly or indirectly.

The processor 1010 may be configured to execute computer-readable program code stored by the memory 1015 to implement one or more aspects of the connection establishing module 1020, the assisting connection determining module 1025, the SIPTO module 1030, the WWAN radio 1050, and/or the backhaul/core network interface 1055. The processor 1010 may also execute computer-readable program code stored by the memory 1015 to execute applications 1017.

The connection establishing module 1020 may be configured to establish a connection between a UE (e.g., one or more of the UEs described above with reference to the previous Figures) and the anchor eNodeB 1005. In certain examples, the connection establishing module 1020 may also establish a SIPTO PDN connection at a local gateway of the anchor eNodeB 1005 for the UE.

The assisting connection determining module 1025 may determine (e.g., by communicating with the UE over the WWAN radio 1050 and/or an assisting eNodeB over the backhaul/core network interface 1055) whether a connection exists or is pending between the UE and an assisting eNodeB (e.g., one or more of the assisting eNodeBs described above with reference to previous Figures).

In certain examples, the assisting connection determining module 1025 may determine whether the connection exists or is pending between the UE and the assisting eNodeB by determining whether data is being received from the second eNodeB for the UE. Additionally or alternatively, the anchor eNodeB 1005 may transmit a request to the UE to establish a connection between the UE and the second eNodeB, and the assisting connection determining module 1025 may determine that a connection between the UE and the assisting eNodeB is pending based on the transmitted request. Additionally or alternatively, the assisting connection determining module 1025 may receive an indication from the second eNodeB (e.g., in an X2 message) that the UE has established a connection with the assisting eNodeB.

In certain examples, a connection may exist between the UE and the assisting eNodeB, or a request may be transmitted to establish such a connection, based on the UE performing a handover from a different assisting eNodeB to the current assisting eNodeB. Additionally or alternatively, a connection may exist between the UE and the assisting eNodeB, or a request may be transmitted to establish such a connection, based on the UE establishing a secondary connection to the assisting eNodeB (e.g., in response to an instruction provided from the anchor eNodeB 1005).

The SIPTO module 1030 may be configured to transmit to a mobility management entity a message that associates a network address for the local gateway of the assisting eNodeB with SIPTO connectivity for the UE. The message may include the network address for the local gateway of the assisting eNodeB, and the network address of the local gateway associated with the assisting eNodeB may be used by the mobility management entity to set up a SIPTO connection for the UE at the second eNodeB. In certain examples, the network address of the local gateway associated with the assisting eNodeB may be forwarded to the mobility management entity via an S1 message. For example, the SIPTO module 1030 may replace a network address of a local gateway associated with the anchor eNodeB 1005 with the network address of the local gateway associated with the assisting eNodeB in a gateway transport layer address information element of the S1 message. Alternatively, the S1 message may include both a network address of the local gateway associated with the anchor eNodeB 1005 and the network address of the local gateway associated with the assisting eNodeB.

In certain examples, the SIPTO module 1030 may be configured to deactivate a SIPTO PDN connection at the anchor eNodeB 1005 in favor of reestablishing the SIPTO PDN connection at the assisting eNodeB. For example, the SIPTO module 1030 may deactivate the SIPTO PDN connection at the anchor eNodeB 1005 in response to determining that a connection exists between the UE and the assisting eNodeB or that a request has been transmitted to establish a connection between the UE and the assisting eNodeB. Additionally or alternatively, the SIPTO module 1030 may deactivate the SIPTO PDN connection at the anchor eNodeB 1005 in response to a determined change in location of the UE.

As part of the procedure for deactivating the SIPTO PDN connection, the SIPTO module 1030 may cause the anchor eNodeB 1005 to transmit a deactivate bearer request message (e.g., to the UE). The deactivate bearer request message may indicate that reactivation for the SIPTO PDN connection is requested, consistent with the principles described above with respect to FIGS. 8-9. In certain examples, the anchor eNodeB 1005 may deactivate the SIPTO PDN connection via an E-RAB release indication message sent over S1 to the mobility management entity. Additionally or alternatively, the anchor eNodeB 1005 may deactivate the SIPTO PDN connection via a delete bearer request message sent over S5 by the local gateway of the anchor eNodeB 1005 to the serving gateway of the core network.

In addition to forwarding the network address of the local gateway of the assisting eNodeB to the mobility management entity and/or establishing and deactivating SIPTO PDN connections of the anchor eNodeB 1005, the SIPTO module 1030 may also establish a SIPTO PDN connection at the local gateway of the assisting eNodeB. As discussed above, the SIPTO PDN connection established at the local gateway of the assisting eNodeB may replace a SIPTO PDN connection of the anchor eNodeB 1005 or a different assisting eNodeB. Alternatively, the SIPTO PDN connection established at the local gateway may be a new PDN connection requested by the UE 915.

The SIPTO module 1030 of the anchor eNodeB 1005 may establish the SIPTO PDN connection at the local gateway of the assisting eNodeB by receiving a request to establish a bearer for the UE, determining whether the request is to establish a bearer that is associated with a SIPTO PDN connection for the UE at the assisting eNodeB, communicating with the assisting eNodeB to establish the bearer in response to a determination that the request is associated with the SIPTO connection for the UE at the assisting eNodeB, and establishing a radio bearer corresponding to the SIPTO PDN connection with the UE.

In certain examples, the request to establish the bearer for the UE may be provided by a mobility management entity (e.g., over an S1 interface) to establish an E-RAB bearer. In certain examples, the SIPTO module 1030 may determine whether the request is associated with the SIPTO PDN connection for the UE at the assisting eNodeB by determining whether the request includes an identifier (e.g., the correlation ID described above with reference to FIGS. 6-7) that correlates the requested bearer with an S5 bearer and/or EPS bearer established between a local gateway of the assisting eNodeB and a serving gateway. In certain examples, the anchor eNodeB 1005 transmits the identifier to the assisting eNodeB during the communication with the assisting eNodeB (e.g., over an X2 interface) to establish the requested bearer.

In additional or alternative examples, the SIPTO module 1030 may determine that the request is associated with the SIPTO PDN connection for the UE at the assisting eNodeB by determining whether a network address of a local gateway of the assisting eNodeB has been sent to the mobility management entity as a SIPTO address for the UE.

In certain examples, the anchor eNodeB 1005 may receive radio bearer configuration parameters from the assisting eNodeB such that the radio bearer corresponding to the SIPTO PDN connection is established based at least in part on the received radio bearer configuration parameters. Additionally or alternatively, the anchor eNodeB 1005 may transmit radio bearer configuration parameters to the assisting eNodeB for establishing the radio bearer corresponding to the SIPTO PDN connection.

Figure 11:
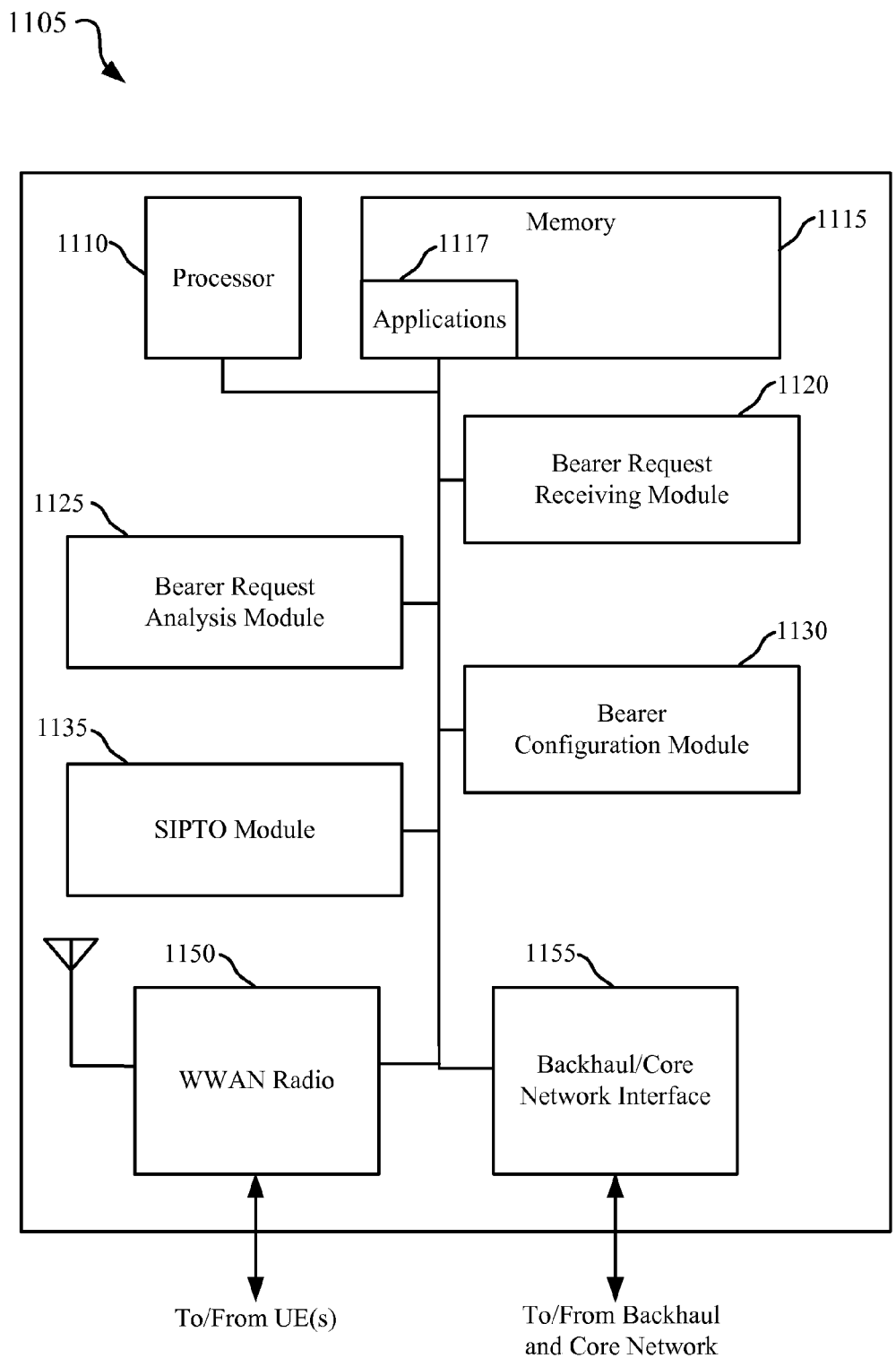
FIG. 11 is a block diagram conceptually illustrating an example of an assisting eNodeB, in accordance with an aspect of the present disclosure.

FIG. 11 is a block diagram conceptually illustrating an example of an assisting eNodeB 1105, in accordance with an aspect of the present disclosure. The assisting eNodeB 1105 may be an example of one or more of the eNodeBs 105, 205, 405, 505, 605, 705, 805, 905, 1005 described above with reference to the previous Figures.

The assisting eNodeB 1105 of FIG. 11 may include a processor 1110, a memory 1115, a bearer request receiving module 1120, a bearer request analysis module 1125, a bearer configuration module 1130, a SIPTO module 1135, a WWAN radio 1150, and a backhaul/core network interface 1155. Each of these components may be in communication, directly or indirectly.

The processor 1110 may be configured to execute computer-readable program code stored by the memory 1115 to implement one or more aspects of the bearer request receiving module 1120, the bearer request analysis module 1125, the bearer configuration module 1130, the SIPTO module 1135, the WWAN radio 1150, and/or the backhaul/core network interface 1155. The processor 1110 may also execute computer-readable program code stored by the memory 1115 to execute applications 1117.

The bearer request receiving module 1120 may be configured to receive a request to establish a bearer for a UE from an anchor eNodeB (e.g., over an X2 interface of the backhaul/core network interface 1155). The bearer request analysis module 1125 may determine whether the request or requested bearer is associated with a SIPTO PDN connection for the UE at the assisting eNodeB 1105. In certain examples, this determination may include determining whether the received request includes an identifier (e.g., the correlation ID described above with reference to FIGS. 6-7) that correlates the requested bearer with an S5 bearer and/or EPS bearer established between the local gateway of the assisting eNodeB 1105 and a serving gateway.

The bearer configuration module 1130 may establish the requested bearer at the assisting eNodeB 1105 based at least in part on a determination that the request or the requested bearer is associated with the SIPTO PDN connection. The bearer configuration module 1130 may also determine radio bearer configuration parameters corresponding to the SIPTO PDN connection for the UE. In certain examples, some or all of the radio bearer configuration parameters may be received from the anchor eNodeB. Additionally or alternatively, the bearer configuration module may transmit the determined radio bearer configuration parameters to the anchor eNodeB to set up the radio bearer.

The SIPTO module 1135 may carry SIPTO network traffic associated with the PDN connection for the UE to a local gateway of the assisting eNodeB 1105. In certain examples, the SIPTO module 1135 may be further configured to deactivate the SIPTO PDN connection at the assisting eNodeB 1105. The deactivation of the SIPTO PDN connection may occur, for example, in response to at least one of: a change in a connection status of the UE, a change in location of the UE, or a change in SIPTO scheduling at the assisting eNodeB 1105. In certain examples, the SIPTO PDN connection may be deactivated by transmitting an E-RAB release indication request over an X2 interface to the anchor eNodeB. Additionally or alternatively, the SIPTO PDN connection may be deactivated by transmitting a delete bearer request message over an S5 interface from a local gateway of the assisting eNodeB to a serving gateway. In certain examples, the delete bearer request message may include a request for bearer reactivation. Additionally or alternatively, the SIPTO PDN connection may be deactivated by receiving a deactivation request from the anchor eNodeB at the assisting eNodeB 1105, and transmitting a deactivation status from the assisting eNodeB 1105 to the anchor eNodeB.

Figure 12:
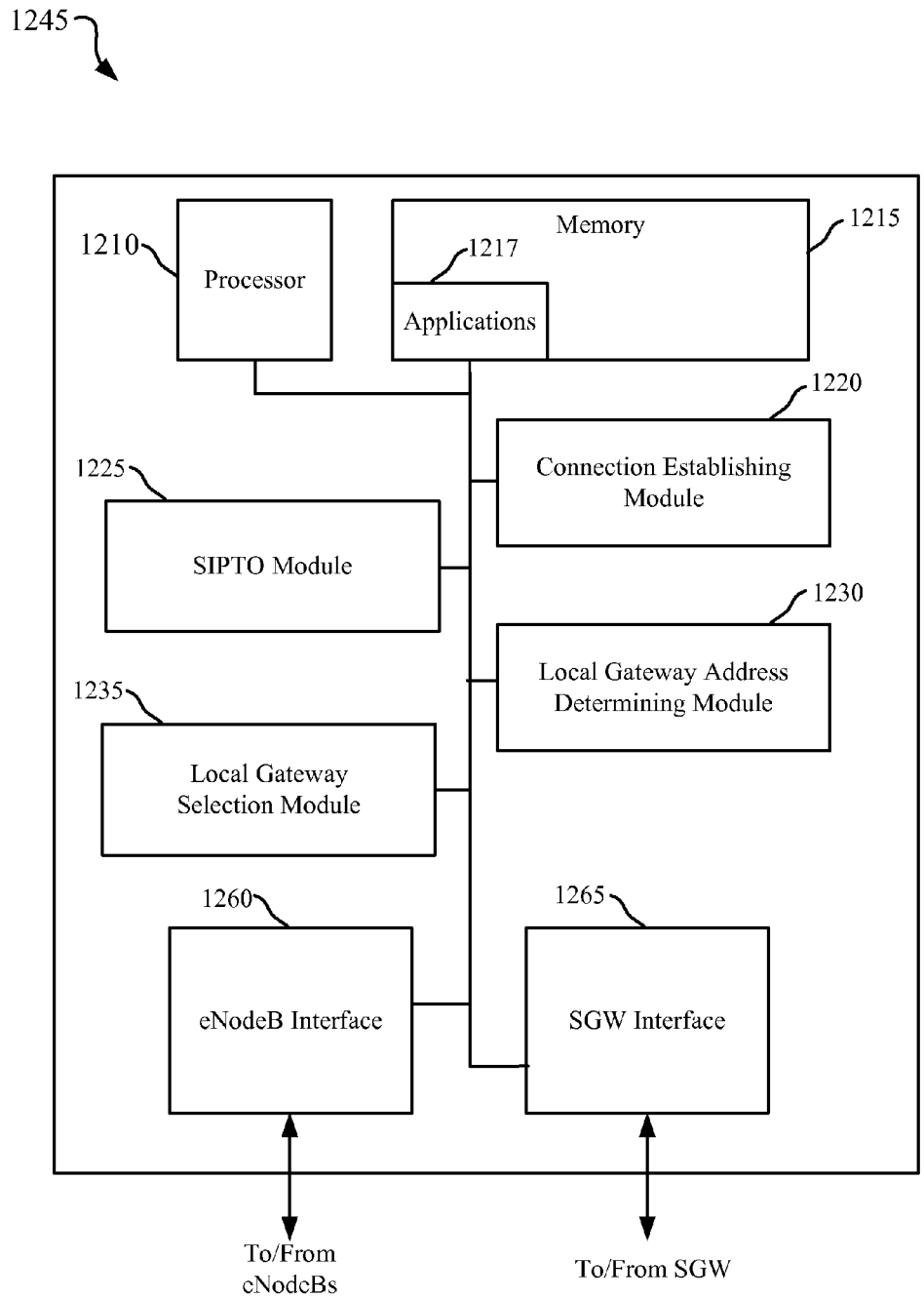
FIG. 12 is a block diagram conceptually illustrating an example of a mobility management entity (MME), in accordance with an aspect of the present disclosure.

FIG. 12 is a block diagram conceptually illustrating an example of a mobility management entity (MME) 1245, in accordance with an aspect of the present disclosure. The mobility management entity 1245 may be an example of one or more of the mobility management entities 545, 645, 745, 845, 945 described above with reference to the previous Figures.

The mobility management entity 1245 of FIG. 12 may include a processor 1210, a memory 1215, a connection establishing module 1220, a SIPTO module 1225, a local gateway address determining module 1230, a local gateway selection module 1235, an eNodeB interface 1260, and a serving gateway interface 1265. Each of these components may be in communication, directly or indirectly.

The processor 1210 may be configured to execute computer-readable program code stored by the memory 1215 to implement one or more aspects of the connection establishing module 1220, the SIPTO module 1225, the local gateway address determining module 1230, the local gateway selection module 1235, the eNodeB interface 1260, and/or the serving gateway interface 1265. The processor 1210 may also execute computer-readable program code stored by the memory 1215 to execute applications 1217.

The connection establishing module 1220 may be configured to receive a request from an eNodeB to establish a PDN connection for a UE. The SIPTO module 1225 may be configured to determine whether SIPTO is permitted for the UE based on a set of stored subscription information for the UE. The stored subscription information for the UE may be received, for example, from a home subscriber server (HSS) associated with the mobility management entity 1245.

The local gateway address determining module 1230 may be configured to determine a first network address of a first local gateway associated with a first eNodeB and a second network address of a second local gateway associated with a second eNodeB. The network addresses may be received from one of the eNodeBs, an OAM server, and/or ascertained by the mobility management entity 1245 by another method. In certain examples, the mobility management entity 1245 may receive a list of available SIPTO network addresses, including the first network address of the first local gateway and the second network address of the second local gateway, from one of the eNodeBs. Additionally or alternatively, the network addresses may be determined based on subscription information for the UE, network policy, and/or types of network addresses. The local gateway selection module 1235 may select one of the first local gateway or the second local gateway to implement the SIPTO for the PDN connection in response to the determination that SIPTO is permitted for the UE. The selection may be based at least in part on policy enforced at the mobility management entity 1245 and/or by a requested local gateway or other input received from one or more of the eNodeBs.

In certain examples, the SIPTO module 1225 may be further configured to deactivate at least one other SIPTO PDN connection of the UE in response to determining that the UE has connected to the second eNodeB or that a request has been transmitted to establish a connection between the UE and the second eNodeB. The at least one other PDN connection deactivated by the SIPTO module 1225 may be routed through the first local gateway associated with the first eNodeB or a third local gateway associated with a third eNodeB.

Figure 13:
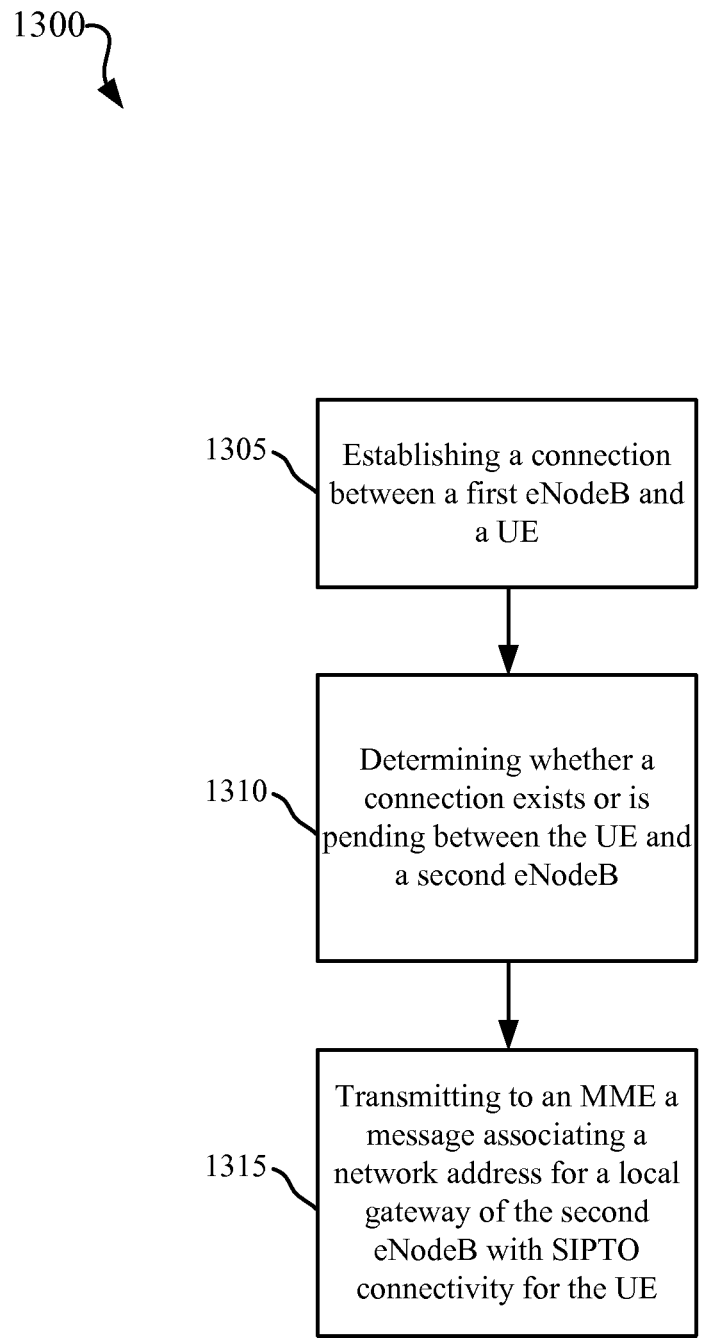
FIG. 13 is a flowchart conceptually illustrating an example of a method of wireless communication, in accordance with an aspect of the present disclosure.

FIG. 13 is a flowchart conceptually illustrating an example of a method 1300 of wireless communication, in accordance with an aspect of the present disclosure. Specifically, FIG. 13 illustrates a method 1300 of setting up SIPTO for a second eNodeB at a first eNodeB. The method 1300 may be implemented in one or more of the wireless communications systems 100, 200, 400, 500, 600, 700, 800, 900 described above with respect to the previous Figures. In particular, the method 1300 may be performed by one or more of the eNodeBs 105, 205, 405, 505, 605, 705, 805, 905, 1005, 1105 described above with reference to the previous Figures.

At block 1305, a connection may be established between a first eNodeB and a UE. In certain examples, the first eNodeB may be an anchor eNodeB for the UE. At block 1310, a determination may be made of whether a connection exists or is pending between the UE and a second eNodeB. In certain examples, the second eNodeB may be an assisting eNodeB for the UE. At block 1315, a message may be transmitted from the first eNodeB to a mobility management entity. The message may associate a network address for a local gateway of the second eNodeB with SIPTO connectivity for the UE. In certain examples, the message may forward the network address for the local gateway of the second eNodeB to the mobility management entity. The mobility management entity may then use the network address for the local gateway of the second eNodeB to set up a SIPTO PDN connection for the UE.

Figure 14:
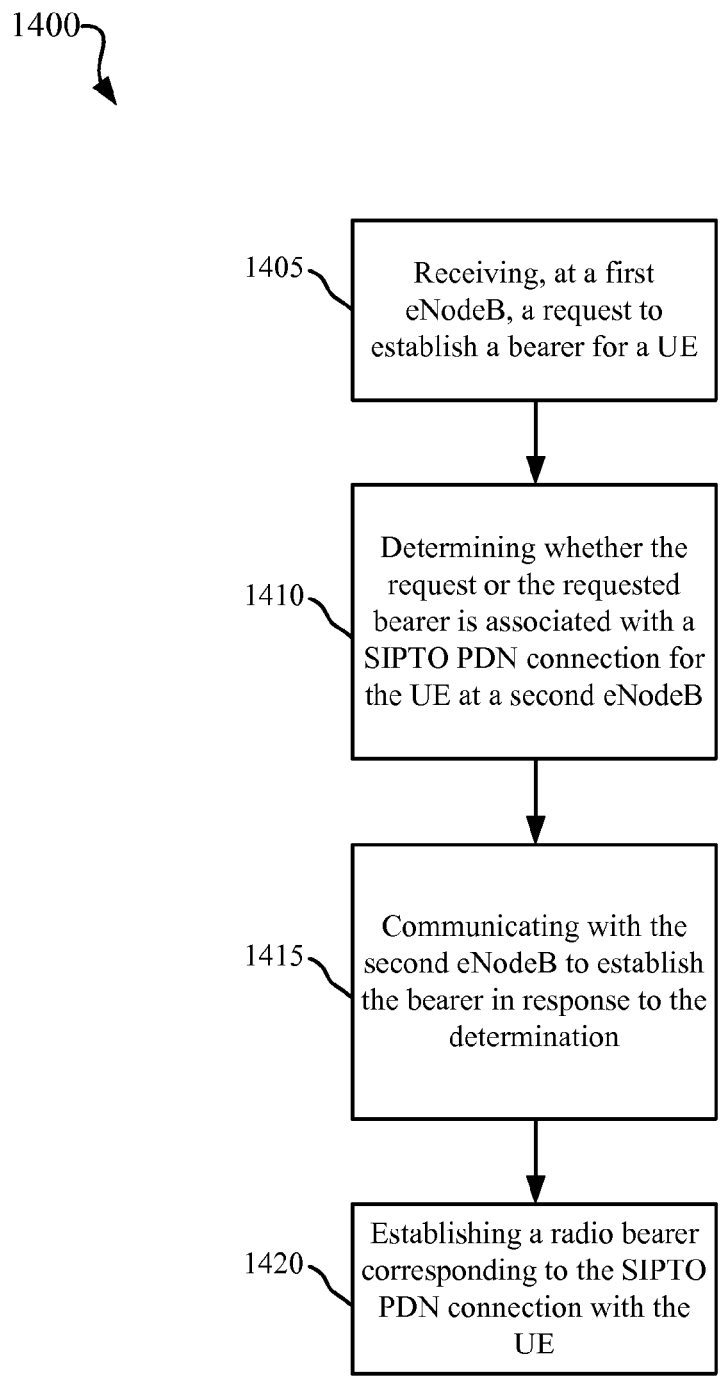
FIG. 14 is a flowchart conceptually illustrating an example of a method of wireless communication, in accordance with an aspect of the present disclosure.

FIG. 14 is a flowchart conceptually illustrating an example of a method 1400 of wireless communication, in accordance with an aspect of the present disclosure. Specifically, FIG. 14 illustrates a method 1400 of setting up SIPTO for a second eNodeB at a first eNodeB. The method 1400 may be implemented in one or more of the wireless communications systems 100, 200, 400, 500, 600, 700, 800, 900 described above with respect to the previous Figures. In particular, the method 1400 may be performed by one or more of the eNodeBs 105, 205, 405, 505, 605, 705, 805, 905, 1005, 1105 described above with reference to the previous Figures.

At block 1405, a request to establish a bearer for a UE may be received at a first eNodeB. In certain examples, the first eNodeB may be an anchor eNodeB for the UE. At block 1410, a determination may be made of whether the request or the requested bearer is associated with a SIPTO PDN connection for the UE at a second eNodeB. In certain examples, the second eNodeB may be an assisting eNodeB for the UE. At block 1415, the first eNodeB may communicate with the second eNodeB to establish the bearer in response to a determination that the requested bearer is associated with the SIPTO PDN connection for the UE at the second eNodeB. At block 1420, a radio bearer corresponding to the SIPTO PDN connection with the UE may be established.

Figure 15:
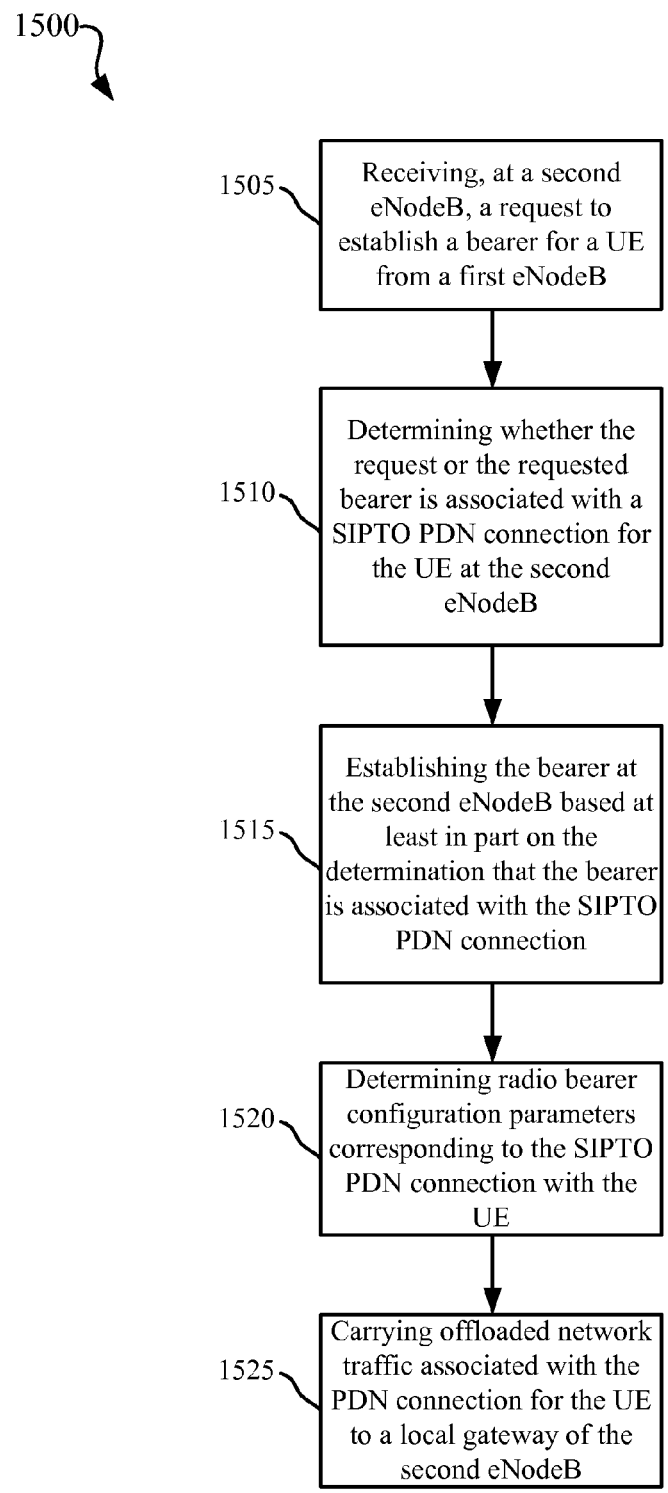
FIG. 15 is a flowchart conceptually illustrating an example of a method of wireless communication, in accordance with an aspect of the present disclosure.

FIG. 15 is a flowchart conceptually illustrating an example of a method 1500 of wireless communication, in accordance with an aspect of the present disclosure. Specifically, FIG. 15 illustrates a method 1500 of setting up SIPTO at a second eNodeB based on communications with a first eNodeB. The method 1500 may be implemented in one or more of the wireless communications systems 100, 200, 400, 500, 600, 700, 800, 900 described above with respect to the previous Figures. In particular, the method 1500 may be performed by one or more of the eNodeBs 105, 205, 405, 505, 605, 705, 805, 905, 1005, 1105 described above with reference to the previous Figures.

At block 1505, a second eNodeB may receive a request to establish a bearer for a UE from a first eNodeB. In certain examples, the first eNodeB may be an anchor eNodeB for the UE, and the second eNodeB may be an assisting eNodeB for the UE. At block 1510, a determination may be made at the second eNodeB of whether the requested bearer is associated with a SIPTO PDN connection for the UE. At block 1515, the requested bearer may be established at the second eNodeB based at least in part on the determination that the request or the requested bearer is associated with the SIPTO PDN connection. At block 1520, the second eNodeB may determine radio bearer configuration parameters corresponding to the SIPTO PDN connection with the UE. At block 1525, the second eNodeB may carry offloaded network traffic associated with the SIPTO PDN connection for the UE to a local gateway of the second eNodeB.

Figure 16:
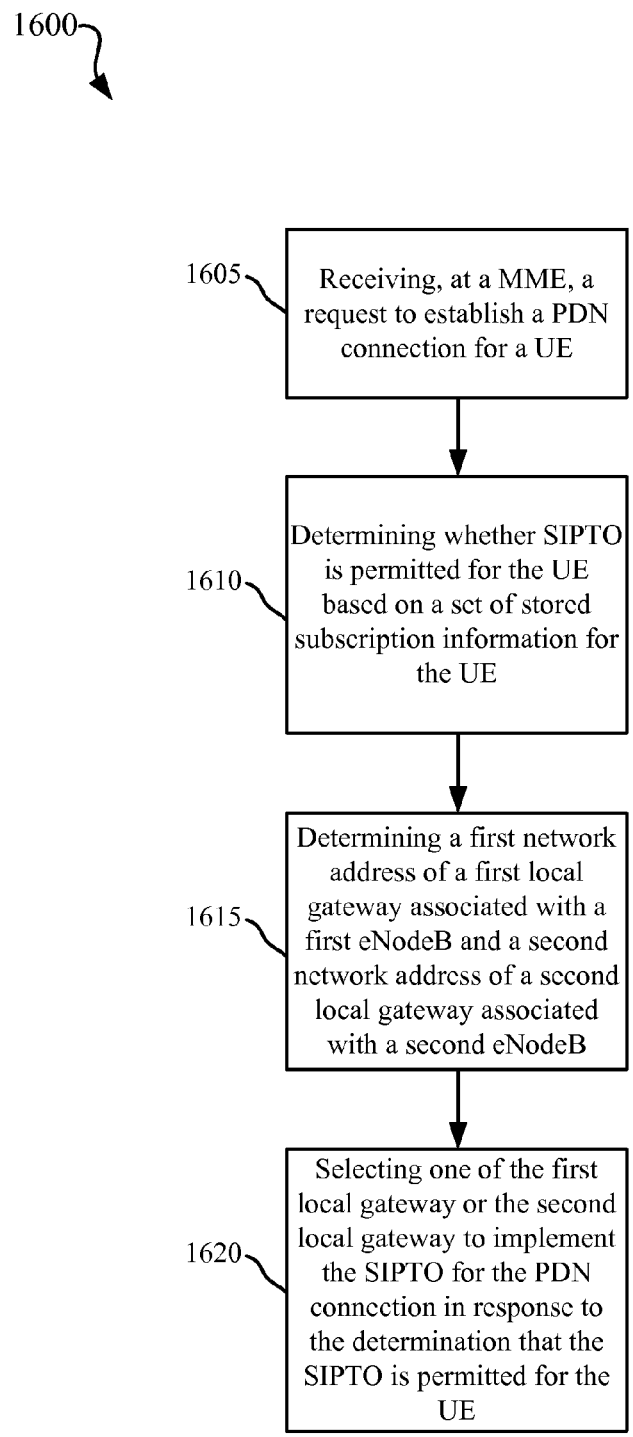
FIG. 16 is a flowchart conceptually illustrating an example of a method of wireless communication, in accordance with an aspect of the present disclosure.

FIG. 16 is a flowchart conceptually illustrating an example of a method of wireless communication, in accordance with an aspect of the present disclosure. Specifically, FIG. 16 illustrates a method 1600 of setting up SIPTO by a mobility management entity. The method 1600 may be implemented in one or more of the wireless communications systems 100, 200, 400, 500, 600, 700, 800, 900 described above with respect to the previous Figures. In particular, the method 1600 may be performed by one or more of the mobility management entities 545, 645, 745, 845, 945, 1245 described above with reference to the previous Figures.

At block 1605, a request may be received at a mobility management entity to establish a PDN connection for a UE. At block 1610, the mobility management entity may determine whether SIPTO is permitted for the requested PDN connection at the UE based on a set of stored subscription information for the UE. At block 1615, the mobility management entity may determine a first network address of a first local gateway associated with a first eNodeB and a second network address of a second local gateway associated with a second eNodeB. In certain examples, one of the eNodeBs may be an anchor eNodeB for the UE and the other of the eNodeBs may be an assisting eNodeB for the UE. At block 1620, the mobility management entity may select one of the first local gateway or the second local gateway to implement the SIPTO for the PDN connection in response to the determination that SIPTO is permitted for the UE.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-Ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein, but is to be accorded the widest scope consistent with the principles and novel features disclosed herein.

What is claimed is:

1. A method of wireless communication at a first eNodeB, comprising:
    establishing a first connection between the first eNodeB and a user equipment (UE), wherein the first connection carries traffic between the UE and a network;
    determining a second connection exists or is pending between the UE and a second eNodeB, the second connection providing additional radio resources for carrying a portion of the traffic between the UE and the network while the UE is connected to the first eNodeB; and
    transmitting to a mobility management entity (MME), based at least in part on the determining, a message associating a network address for a local gateway of the second eNodeB with selected internet protocol traffic offload (SIPTO) connectivity for the UE, wherein the transmission of the message by the first eNodeB enables the MME to set up a SIPTO connection to offload the portion of the traffic between the UE and the network through the local gateway of the second eNodeB.

2. The method of claim 1, wherein the network address of the local gateway associated with the second eNodeB is forwarded to the mobility management entity via an S1 message.

3. The method of claim 2, further comprising:
    replacing a network address of a local gateway associated with the first eNodeB with the network address of the local gateway associated with the second eNodeB in a gateway transport layer address information element of the S1 message.

4. The method of claim 2, wherein the S1 message further comprises a network address of a local gateway associated with the first eNodeB.

5. The method of claim 1, further comprising:
    deactivating a SIPTO packet data network (PDN) connection at the first eNodeB.

6. The method of claim 5, wherein the SIPTO PDN connection is deactivated in response to determining that the connection exists between the UE and the second eNodeB.

7. The method of claim 5, wherein the deactivation of the SIPTO PDN connection at the first eNodeB is in response to a change in location of the UE.

8. The method of claim 5, further comprising:
    transmitting a deactivate bearer request message in connection with deactivating the SIPTO PDN connection, wherein the deactivate bearer request message comprises a reactivation request.

9. The method of claim 5, wherein the SIPTO PDN connection is deactivated via an E-RAB release message transmitted over an S1 interface.

10. The method of claim 5, wherein the SIPTO PDN connection is deactivated via a delete bearer request message transmitted over an S5 interface.

11. A method of managing wireless communications at a mobility management entity (MME), comprising:
    receiving, from a first eNodeB connected to a user equipment (UE), a request to establish a packet data network (PDN) connection for the UE and a list of network addresses for providing selected internet protocol traffic offload (SIPTO) connectivity for the UE, wherein the list of network addresses associates a first network address for a first local gateway of the first eNodeB and a second network address for a second local gateway of a second eNodeB with SIPTO connectivity for the UE, wherein a first connection between the UE and the first eNodeB carries traffic between the UE and a network, and wherein a second connection between the UE and the second eNodeB provides additional radio resources for carrying a portion of the traffic between the UE and the network while the UE is connected to the first eNodeB;

determining whether selected internet protocol traffic offload (SIPTO) is permitted for the UE based on a set of stored subscription information for the UE;

selecting the second local gateway to implement the SIPTO for the PDN connection, in response to receiving the request from the first eNodeB and in response to the determination that the SIPTO is permitted for the UE; and setting up the SIPTO for the PDN connection at the second eNodeB to offload the portion of the traffic between the UE and the network through the second local gateway of the second eNodeB.

12. The method of claim 11, further comprising:
deactivating at least one other SIPTO PDN connection of the UE in response to determining that the UE is connected to the second eNodeB.

13. The method of claim 12, wherein the at least one other SIPTO PDN connection of the UE is routed through one of the first local gateway or a third local gateway associated with a third eNodeB.

14. A first eNodeB for wireless communication, comprising:
a processor;
memory in electronic communication with the processor; and
instructions stored in the memory, the instructions being executable by the processor to:
establish a first connection between the first eNodeB and a user equipment (UE), wherein the first connection carries traffic between the UE and a network;
determine a second connection exists or is pending between the UE and a second eNodeB, the second connection providing additional radio resources for carrying a portion of the traffic between the UE and the network while the UE is connected to the first eNodeB; and
transmit to a mobility management entity (MME), based at least in part on the determining, a message associating a network address for a local gateway of the second eNodeB with selected internet protocol traffic offload (SIPTO) connectivity for the UE, wherein the transmission of the message by the first eNodeB enables the MME to set up a SIPTO connection to offload the portion of the traffic between the UE and the network through the local gateway of the second eNodeB.

15. The first eNodeB of claim 14, wherein the network address of the local gateway associated with the second eNodeB is forwarded to the mobility management entity via an S1 message.

16. The first eNodeB of claim 15, wherein the instructions are executable by the processor to:
replace a network address of a local gateway associated with the first eNodeB with the network address of the local gateway associated with the second eNodeB in a gateway transport layer address information element of the S1 message.

17. The first eNodeB of claim 15, wherein the S1 message further comprises a network address of a local gateway associated with the first eNodeB.

18. The first eNodeB of claim 14, wherein the instructions are executable by the processor to:
deactivate a SIPTO packet data network (PDN) connection at the first eNodeB.

19. The first eNodeB of claim 18, wherein the SIPTO PDN connection is deactivated in response to determining that the connection exists between the UE and the second eNodeB.

20. The first eNodeB of claim 18, wherein the deactivation of the SIPTO PDN connection at the first eNodeB is in response to a change in location of the UE.

21. The first eNodeB of claim 18, wherein the instructions are executable by the processor to:
transmit a deactivate bearer request message in connection with deactivating the SIPTO PDN connection, wherein the deactivate bearer request message comprises a reactivation request.

22. The first eNodeB of claim 18, wherein the SIPTO PDN connection is deactivated via an E-RAB release message transmitted over an S1 interface.

23. The first eNodeB of claim 18, wherein the SIPTO PDN connection is deactivated via a delete bearer request message transmitted over an S5 interface.

24. A mobility management entity (MME) for managing wireless communications, comprising:
a processor;
memory in electronic communication with the processor; and
instructions stored in the memory, the instructions being executable by the processor to:
receive, from a first eNodeB connected to a user equipment (UE), a request to establish a packet data network (PDN) connection for the UE and a list of network addresses for providing selected internet protocol traffic offload (SIPTO) connectivity for the UE, wherein the list of network addresses associates a first network address for a first local gateway of the first eNodeB and a second network address for a second local gateway of a second eNodeB with SIPTO connectivity for the UE, wherein a first connection between the UE and the first eNodeB carries traffic between the UE and a network, and wherein a second connection between the UE and the second eNodeB provides additional radio resources for carrying a portion of the traffic between the UE and the network while the UE is connected to the first eNodeB;
determine whether selected internet protocol traffic offload (SIPTO) is permitted for the UE based on a set of stored subscription information for the UE;
select the second local gateway to implement the SIPTO for the PDN connection, in response to receiving the request from the first eNodeB and in response to the determination that the SIPTO is permitted for the UE; and
set up the SIPTO for the PDN connection at the second eNodeB to offload the portion of the traffic between the UE and the network through the second local gateway of the second eNodeB.

25. The MME of claim 24, wherein the instructions are executable by the processor to:

deactivate at least one other SIPTO PDN connection of the UE in response to determining that the UE is connected to the second eNodeB.

26. The MME of claim 25, wherein the at least one other SIPTO PDN connection of the UE is routed through one of the first local gateway or a third local gateway associated with a third eNodeB.

* * * * *